(12) United States Patent
Terada et al.

(10) Patent No.: US 7,849,319 B2
(45) Date of Patent: Dec. 7, 2010

(54) METHOD AND DEVICE FOR INCORPORATING ADDITIONAL INFORMATION INTO MAIN INFORMATION THROUGH ELECTRONIC WATERMARKING TECHNIQUE

(75) Inventors: Kosei Terada, Hamamatsu (JP); Hideaki Taruguchi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 12/273,672

(22) Filed: Nov. 19, 2008

(65) Prior Publication Data

US 2009/0092244 A1  Apr. 9, 2009

Related U.S. Application Data

(62) Division of application No. 09/912,897, filed on Jul. 25, 2001, now Pat. No. 7,545,936, which is a division of application No. 09/111,605, filed on Jul. 7, 1998, now Pat. No. 6,959,383.

(30) Foreign Application Priority Data

Jul. 10, 1997   (JP)   ................................ 9-200972
Dec. 4, 1997   (JP)   ................................ 9-350126

(51) Int. Cl.
*H04L 9/32*       (2006.01)
*G06F 11/30*      (2006.01)
*G06K 9/46*       (2006.01)
*H04N 1/40*       (2006.01)
*H04L 9/00*       (2006.01)
*G06T 1/00*       (2006.01)

(52) U.S. Cl. .................. 713/176; 713/168; 713/193; 382/190; 382/191; 358/3.28

(58) Field of Classification Search ............... 713/176, 713/168, 193; 382/190, 191; 358/3.28
See application file for complete search history.

(56) References Cited

U.S. PATENT DOCUMENTS 5,646,997 A   7/1997   Barton
(Continued)

FOREIGN PATENT DOCUMENTS

EP   0581317   2/1994
(Continued)

OTHER PUBLICATIONS

Darko Kirovski, Henrique Malvar, Yacov Yacobi, "Multimedia content screening using a dual watermarking and fingerprinting system", Dec. 2002, Multimedia '02: Proceedings of the tenth ACM international conference on Multimedia Publisher: ACM, pp. 372-381.*

(Continued)

*Primary Examiner*—Michael Pyzocha
*Assistant Examiner*—Courtney D Fields
(74) *Attorney, Agent, or Firm*—Morrison & Foerster LLP

(57) ABSTRACT

Two data units are selected from main information, such as MIDI data, into which additional information is to be incorporated, to calculate a difference between respective values of the two data units. A particular data segment to be incorporated into one of the MIDI data units is selected from a group of data of additional information. The size of the data segment to be incorporated into one of the data units may be either one bit or two or more bits. Substitute data to replace the content of one MIDI data unit is generated on the basis of a predetermined function using, as variables, the data-related value and a value of the particular data segment, and the content of the data unit corresponding to a predetermined one of the two MIDI data units is replaced by the generated substitute data. Thus, through such an electronic watermarking technique, any desired additional information can be incorporated into the MIDI data without changing the MIDI data format. In another implementation, data of encoding information, representative of an encoding procedure, are incorporated dispersedly into particular data units belonging to a predetermined first data group of the main information, and data belonging to a predetermined second data group of the main information are encoded by the encoding procedure represented by the encoding information.

12 Claims, 13 Drawing Sheets

U.S. PATENT DOCUMENTS

| | | |
|---|---|---|
| 6,209,096 B1 * | 3/2001 | Taruguchi .................. 713/193 |
| 6,363,357 B1 | 3/2002 | Rosenberg et al. |
| 6,512,836 B1 | 1/2003 | Xie et al. |
| 6,522,767 B1 | 2/2003 | Moskowitz et al. |
| 6,532,541 B1 | 3/2003 | Chang et al. |
| 6,546,139 B1 | 4/2003 | Kondo et al. |
| 6,959,383 B1 | 10/2005 | Terada et al. |
| 2001/0021260 A1 | 9/2001 | Chung et al. |
| 2001/0046298 A1 | 11/2001 | Terada et al. |

FOREIGN PATENT DOCUMENTS

| | | |
|---|---|---|
| EP | 0651554 | 10/1994 |
| EP | 0766468 | 9/1996 |
| EP | 0777197 | 11/1996 |
| EP | 0840513 | 11/1997 |
| EP | 1039414 A2 * | 9/2000 |
| GB | 2324669 | 10/1998 |
| GB | 2326048 | 12/1998 |
| JP | 1286674 | 11/1989 |
| JP | 8305379 | 11/1996 |
| JP | 9163339 | 6/1997 |
| JP | 11259067 | 9/1999 |

OTHER PUBLICATIONS

R.G. van Schyndel et al., (1994), "A Digital Watermark," IEEE Computer Society Press, vol. 1, pp. 86-90.

L. Boney et al., (1996), "Digital Watermarks for Audio Signals," IEEE Computer Society Press, pp. 473-480.

* cited by examiner

KEY CODE

(2ND QUADRANT) | | | (1ST QUADRANT)
---|---|---|---
1111 | 1110 | ↑ 127 ⟨ 120 | 1110 | 1111
1101 | 1100 | 119 ⟨ 112 | 1100 | 1101
1011 | 1010 | 111 ⟨ 104 | 1010 | 1011
1001 | 1000 | 103 ⟨ 96 | 1000 | 1001
0111 | 0110 | 95 ⟨ 88 | 0110 | 0111
0101 | 0100 | 87 ⟨ 80 | 0100 | 0101
0011 | 0010 | 79 ⟨ 72 | 0010 | 0011
0001 | 0000 | 71 ⟨ 64 | 0000 | 0001

← 0    31 | 32    63 | | 64    95 | 96    127 → VELOCITY

| | | 63 ⟨ 56 | | |
---|---|---|---|---
0001 | 0000 |  | 0000 | 0001
0011 | 0010 | 55 ⟨ 48 | 0010 | 0011
0101 | 0100 | 47 ⟨ 40 | 0100 | 0101
0111 | 0110 | 39 ⟨ 32 | 0110 | 0111
1001 | 1000 | 31 ⟨ 24 | 1000 | 1001
1011 | 1010 | 23 ⟨ 16 | 1010 | 1011
1101 | 1100 | 15 ⟨ 8 | 1100 | 1101
1111 | 1110 | 7 ⟨ 0 | 1110 | 1111

(3RD QUADRANT) | | | (4TH QUADRANT)

F I G. 5

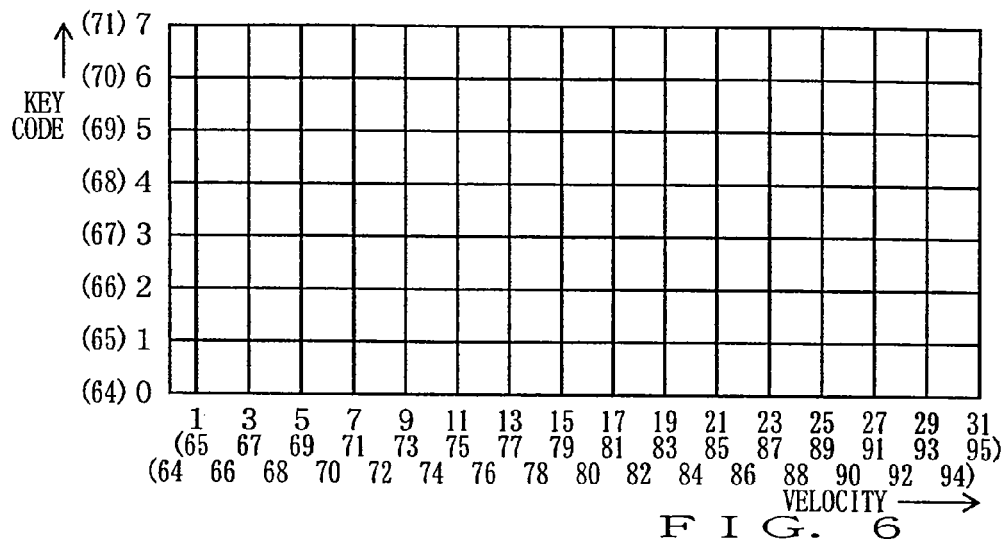

FIG. 6

| 4 BITS | 4 BITS | 8 BITS |
|---|---|---|
| ALGORITHM | COUNT | VALUE |
| MODIFY NOTE NO. OF KEY-ON DATA | NUMBER OF EVENTS TO BE MODIFIED | TRANSPOSE VALUE (MODIFIED NOTE VALUE) |
| REPLACE NOTE & VELOCITY OF KEY-ON DATA | NUMBER OF EVENTS TO BE MODIFIED | NONE |
| MODIFY INTERVAL DATA | NUMBER OF EVENTS TO BE MODIFIED | MODIFIED VALUE |
| MODIFY CHANNEL DATA OF KEY-ON DATA | NUMBER OF EVENTS TO BE MODIFIED | MODIFIED CHANNEL |
| ⋮ | ⋮ | ⋮ |
| OTHERS | | |

FIG. 7

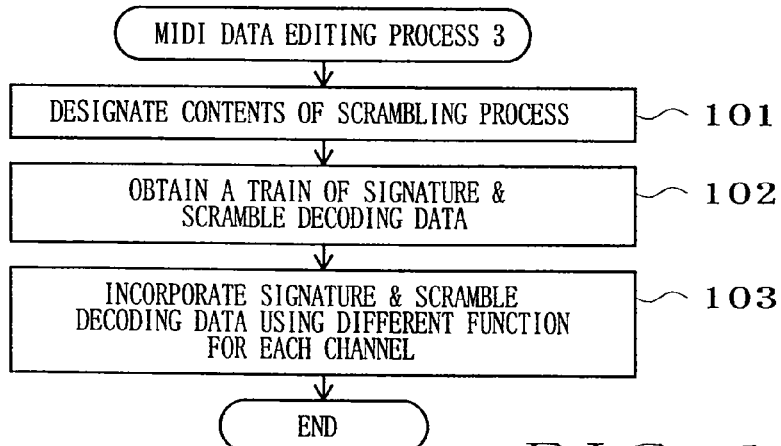

FIG. 10

METHOD AND DEVICE FOR INCORPORATING ADDITIONAL INFORMATION INTO MAIN INFORMATION THROUGH ELECTRONIC WATERMARKING TECHNIQUE

CROSS-REFERENCE TO RELATED APPLICATIONS

This application is a division of U.S. patent application Ser. No. 09/912,897, filed Jul. 25, 2001, now U.S. Pat. No. 7,545,936, which is a division of U.S. patent application Ser. No. 09/111,605, filed Jul. 7, 1998, now U.S. Pat. No. 6,959,383, the entire disclosures of which are incorporated herein by reference.

BACKGROUND OF THE INVENTION

The present invention relates to a method and device which encode main information, such as tone control information (MIDI data), and supplementary or additional information for storage in an electronic storage medium, and reproduce original main and additional information on the basis of the encoded main and additional information stored in the storage medium. The present invention also relates to an electronic storage medium containing such encoded main and additional information, or a software program for implementing the above-mentioned method and device.

In recent years, it has become possible for us to readily create music data, image data, waveform data, etc. and make various alterations to these data by use of a personal computer. Thus, using a personal computer, we can freely read out music data, image data, waveform data, etc. recorded on a commercially available storage medium, such as an FD (Floppy Disk), CD-ROM (Compact Disk-Read Only Memory) and LD (Laser Disk), and make various alterations to the read-out data.

However, because the copyright on the data recorded on a commercially available CD-ROM or LD is owned by the distributor or manufacturer of the storage medium, freely altering the recorded data would constitute an infringement of the copyright and hence should not be tolerated.

At present, in an attempt to obviate such a copyright infringement, copyright indication data specifying who owns the copyright on main data, such as music data, image data or waveform data, recorded in a main data recording section of a CD-ROM or LD is attached as additional information to a header section, separate from the main data recording section, of the storage medium, so as to clearly indicate the copyright holder. Other than such copyright indication data, the additional information sometimes includes information indicative of the title of the music data, image data and waveform data, or recording-format information that indicates a particular sort of data compression technique used for compressing the data.

However, because the data can be freely rewritten or altered by use of a personal computer or otherwise, a significant problem may be encountered that any of the additional information, such as the copyright indication data, is readily deleted, altered or rewritten on purpose or by mistake. In particular, where such additional information is stored in the header section, the additional information may be deleted or altered quite easily.

Further, with the recent advancement of communication networks, there could arise another significant problem that music data, image data or waveform data with the copyright indication data deleted or alerted in an unfair manner is widely distributed via communication networks.

SUMMARY OF THE INVENTION

It is therefore an object of the present invention to provide a method and device which can attach supplementary or additional information to main information, such as music data, image data or waveform data, without changing the data format of the main information and also encode the main and additional information in such a manner that these information can not be appropriately reproduced and used unless they are decoded.

In order to accomplish the above-mentioned object, the present invention provides a method of incorporating, into data of first information, data of second information, the data of the first information including a group of data units, which comprising the steps of: selecting at least two of the data units of the first information and obtaining a data-related value that relates to respective values of the at least two data units; selecting, from among a group of the data of the second information, a particular data segment to be incorporated into one of the data units of the first information; generating substitute data to replace a content of the one data unit of the first information, on the basis of a predetermined function using, as variables, the data-related value and a value of the particular data segment; and replacing a content of the data unit corresponding to a predetermined one of the at least two data units of the first information, by the substitute data generated by the step of generating.

The above-mentioned first information corresponds to "main information", which may, for example, be MIDI-format musical performance information. The first information has a relatively large volume as a whole and is normally stored in a predetermined main data storage area of a memory. The second information corresponds to "supplementary" or "additional" information, which may, for example, be copyright indication information attached to the first information or musical performance information stored in the main data storage area and typically has a smaller volume than the first information. For example, according to the present invention, the first information is stored in the main data storage area, and the second information is incorporated or embedded in constituent data of the first information and stored therewith in the main data storage area rather than in the header area of the memory. In this case, either part or the whole of the second or additional information may be incorporated in the constituent data of the first information.

According to the invention thus arranged, at least two of the data units of the first information are selected to obtain a data-related value that relates to the respective values of the at least two data units. This data-related value may, for example, be a difference between respective values of two successive or adjoining data units. A particular data segment to be incorporated into one of the data units of the first information is selected from among a group of the data of the second information. The size of the data segment to be incorporated into one of the data units of the first information may be either one bit or two or more bits depending on the application. Substitute data to replace the content of the one data unit of the first information is generated on the basis of a predetermined function using, as variables, the data-related value and a value of the particular data segment, and the content of the data unit, corresponding to a predetermined one of the at least two data units of the first information, is replaced by the generated substitute data. By thus wholly replacing the content of the corresponding data unit by the generated substitute data, the data segment of the second information can be made relatively large in size and the second information can be incorporated into the first information efficiently. Further, with the arrangement that the content of the data unit is replaced, the data format of the first information can be left unchanged from the original; thus, any desired types and contents of data can be incorporated, as the second information, into the first information, without involving a change in the data format of the first (main) information. In other words, any desired second information can be incorporated into the first information through an "electronic watermarking" technique.

The predetermined function for use in generating the substitute data may be implemented by executing a predetermined arithmetic operation using the data-related value and value of the particular data segment as variables, or by referring to a predetermined conversion table using the data-related value and value of the particular data segment as variables.

In a preferred implementation of the present invention, the step of selecting includes a step of detecting a particular section of the first information where a difference between values of two successive data units is smaller than a predetermined value and selecting one of such successive data units as the data unit to be replaced by the substitute data. This means that the selection of the to-be-replaced data unit is made from a particular section, in the successive arrangement of the data units of the first information, where there is a relatively small variation or difference between the values of adjoining data units. By so doing, it is possible to minimize the inconvenience that the data replacement would result in disorder in reproduced data.

For reproduction of the first information from among its data group having the second information incorporated therein, the method may further comprise: a first reproduction step of reproducing the data-related value and the value of the particular data segment from the replaced data unit; and a second reproduction step of reproducing the original content of the replaced data unit on the basis of the data-related value reproduced by the first reproduction step. The data-related value relates to an original content of the replaced data unit and a content of another data unit. Because the original content of the replaced data unit is unknown and the content of the other data unit is known, the unknown original content of the replaced data unit can be reproduced on the basis of the reproduced data-related value and the content of the other data unit. In a situation where the data-related value is a difference between the values of adjoining data units as mentioned above, the original content of the replaced data unit can be reproduced by adding or subtracting the data-related value to or from the known content of the other data unit. The data-related value relating to the two data units of the first information is other than the above-mentioned difference, such as a sum, product or quotient or a value obtained on the basis of a predetermined function or a table.

To indicate whether a given data unit of the first information has been replaced or not, a suitable flag value may be embedded in the data unit, which would greatly facilitate the data reproduction. As a matter of fact, incorporating such a flag value may disorder or disorganize the reproduced data, and thus the original content of the replaced data unit may not be reproduced accurately, sometimes involving a disorder in the lower-bit value. However, the present invention tolerates some degree of disorder that would be encountered at the time of the data reproduction; namely, because the unknown original content of the replaced data unit can be recognized only with some disorder in the lower-bit value if not reproduced completely accurately, even a situation where only approximate values can be reproduced is assumed to fall within the technical definition of "reproducing the original content of the replaced data unit" as used in the present invention. For example, since velocity data in MIDI data determines a volume of a tone to be generated, some degree of disorder in its lower-bit value would not present a significant problem of deteriorated reproducing performance. For this reason, the data replacing process to incorporate the second information may be advantageously applied to data of such nature that could not appreciably deteriorate the reproducing performance.

As an example, an electronic information processing system employing the method of the present invention is designed to edit the main information to embed various pieces of the additional information in the main information and encode the main information. Examples of the main information include MIDI key-on event data, program change data and control change data, waveform data and image data, while examples of the additional information, while examples of the additional information include letter data representative of the name of an author of a music piece in question, title of the music piece and the title of image data, and data representative of a data format employed such as a waveform data compression scheme, as well as other data such as a cryptogram, key information, ID, password and latest news. Where the additional information is MIDI data, this electronic information processing system uses a key-on event data group as a predetermined data group constituting the main information, and uses velocity data and key code data, as data units in the key-on event data group, to calculate a difference between values of every two successive data units.

Because the velocity and key code data would take any of values in the range of "0" to "127" in a MIDI message, these data may be divided into a value range of "0" to "63" corresponding to the negative difference values and a value range of "64" to "127" corresponding to the positive difference values. Where each piece of the additional information consists of four-bit data, for example, the three bits may be allocated to key code data while the remaining one bit may be allocated to velocity data. In this case, the key code data can be divided into eight value groups, such as "0-7", "8-15", . . . , "56-63", corresponding to the negative difference values as well as eight other value groups, such as "64-71", "72-79", . . . , "120-127", corresponding to the positive difference values, and the velocity data can be divided into two value groups, such as "0-31" and "32-63" corresponding to the negative difference values as well as two other value groups, such as "64-95" and "96-127" corresponding to the positive difference values. If these key code and velocity values are mapped to the respective axes of X-Y coordinates, four value polarity combinations: one with positive key code and velocity difference values; one with positive key code difference values and negative velocity difference values; one with negative key code and negative velocity difference values; and one with negative key code difference values and positive velocity difference values will correspond to the four quadrants of the X-Y coordinates, respectively.

This way, individual quadrants are established depending on the polarity of the key code and velocity difference values, ranges of the key code and velocity values are established depending on the value of the additional information, and particular values within the range are determined depending on the difference value, so that the key code and velocity can be converted into different values by using the determined values as new key code and velocity values. Because the converted key code and velocity values have no correlation to the original values, they would be reproduced, via automatic performance operations, in scrambled (encoded) form and could not form a musical performance sound. Further, because plural-bit data can be embedded, as additional information, in each key-on event data, the present invention achieves the benefit that a great quantity of data can be transmitted along with the main information without deteriorating the quality of the main information.

Data groups of the thus-edited main information may be stored in an electronic recording medium or delivered via a communication network. According to a second aspect of the present invention, there is proposed a method of appropriately reproducing main (first) and additional (second) information from among a data group read out from a recording medium or delivered via a communication network. Specifically, the method comprises a step of reproducing the data-related value and value of the particular data segment from the data group of the first information, replaced by the substitute data, read out from the recording medium or received via the communication network, and a step of reproducing an original content of the replaced data unit on the basis of the data-related value reproduced by the first step. The reproduced additional (second) information may be visually displayed. Namely, where the additional (second) information incorporated in the main (first) information comprises data relating to a data format used for, for example, compressing text data or waveform data, or other data such as a cryptogram, key information, ID, password or news, the additional information may be shown on a display screen. Where such data are delivered one after another via the communication network, they may be displayed in a sequential manner.

According to still another aspect of the present invention, there is provided a method of encoding main information, data of the main information including a group of data units, which comprises: a first step of incorporating data of encoding information, representative of an encoding procedure, dispersedly into particular ones of the data units belonging to a predetermined first data group of the main information; and a second step of executing the encoding procedure, represented by the encoding information, on the data belonging to a predetermined second data group of the main information. Here, the encoding information necessary for a predetermined encoding procedure (in other words, information necessary for decoding the encoded information at the time of its reproduction) is incorporated dispersedly into the first data group of the main information. Thus, in the first data group of the main information, the additional information can be incorporated through the electronic watermarking technique according to a suitable algorithm, without changing the data format of the main information. Actual or full-scale encoding is applied to data belonging to the second data group of the main information, in accordance with the encoding procedure represented by the encoding information.

To reproduce the main information encoded in the above-mentioned manner, the present invention further provides a method which comprises: a step of reproducing the encoding information, from the first data group of the main information having the encoding information incorporated therein; and a step of, on the basis of the reproduced encoding information, decoding the data of the second data group to thereby reproduce the main information. Only a person authorized to decode the encoding information can reproduce the encoding information by practicing this method and then use the reproduced encoding information to decode the data of the second data group to thereby reproduce the main information. Where the main information is music information such as MIDI information, the electronic watermarking, of the first data group of the main information, by the encoding information can be made relatively weak, so that even when any person unauthorized to decode the encoding information reproduces the first data group of the main information without decoding the electronic watermark by the encoding information, the person can auditorily test a corresponding music piece without significant hindrance. On the other hand, because the second data group of the main information is actually encoded on the full-scale basis, any person unauthorized to decode the encoding information can not acquire the encoding information from the first data group and hence can not appropriately cancel the encoded state of the second data group. This way, such an effective application is achieved that whereas anyone can auditorily test a portion of a music piece corresponding to the first data group, only an authorized person can utilize another portion of the music piece corresponding to the second data group.

As an example, the main information may be MIDI key-on event data, program change data and control change data, waveform data or image data, similarly to the foregoing. In a preferred embodiment to be described below, the encoding information is referred to as "scramble data" or "scramble decoding data" in the sense that it scrambles the main information. The scramble data is data indicative of a scrambling (i.e., encoding) procedure; because the scramble data can be used to cancel (decode) the scrambled (encoded) state, the term "scramble decoding data" is used herein in the same sense as the scramble data. The MIDI data may be encoded (scrambled) in any one of a variety of ways, which include, for example, one where the encoding is done by changing the note number of MIDI key-on data, one where the encoding is done by changing the value of MIDI interval data, and one where the encoding is done by changing the channel data of key-on data. Specifically, the encoding information, namely, scramble data (or scramble decoding data) indicates a particular type of encoding procedure employed.

According to one exemplary way of incorporating the scramble data as the encoding information into the MIDI data as the main information, a value of part (most preferably, the lowermost or least significant bit) of velocity data in MIDI key-on event data is modified on the basis of a content of a particular segment of the scramble data. Consequently, the least significant bit of the velocity data is modified or not modified depending on the content of the particular segment. In this way, contents of the scramble data will be recorded dispersedly within a MIDI data group. Where the main information is in the form of MIDI data, it is desirable that data to be modified by the incorporation of the scramble data be velocity data or duration time data, because strict accuracy is normally not required of such data and some degree of error in its lower-bit value would not present a significant problem; that is, some degree of modification in such information would virtually not be perceived aurally by a human listener as long as the information is sound data. Where the main information is waveform data, the least significant bit of the waveform data itself may be modified; the same applies to image data.

Part of the main information (e.g., MIDI data), where the scramble data is embedded, can be reproduced with no significant inconvenience even when it is reproduced without cancelling the electronic watermark by a particular segment of the scramble data. On the other hand, if reproduced without the decoding, encoded parts of the main information can no longer form a musical performance because of their scrambled nature, although they still maintain the MIDI data format. Therefore, the original musical performance can not be reproduced accurately unless an authorized device or reproducing software is used properly to reproduce the scramble data embedded in the main information and cancel the encoded state with the reproduced scramble data.

According to still another aspect of the present invention, in the above-mentioned first step of incorporating data of encoding information dispersedly into the first data group of the main information, the first data group of the main information may be classified into at least two groups according to the data characteristics thereof, and the encoding information may be incorporated redundantly into at least the two characteristic groups. In a preferred implementation, the first step is arranged to incorporate the encoding information into each of the characteristic groups in accordance with an algorithm unique to the characteristic group. Thus, even when data in a given characteristic group have been modified collectively with the encoding information (scramble data) also modified to a non-reproducible degree, the encoding information incorporated in any one of the other characteristic group may be reproduced and used to decode the second data group. Namely, where the main information is MIDI data, it is likely that the contents of the MIDI data will be replaced or key codes will be shifted due to "transposition" on a channel-by-channel basis; in such a case, it is no longer possible to detect and reproduce the scramble data from the main information. This is the reason why the MIDI data is classified into at least two characteristic groups in accordance with a given classification condition predetermined per channel or occurrent timing of program change data and the encoding information is incorporated redundantly into each of the characteristic groups. With this arrangement, even when there has occurred data modification in any one of the characteristic groups, such as the one where the channel information has been replaced directly to cause data rewriting, the encoded state of the second data group can be cancelled by detecting and reproducing the encoding information incorporated in any other characteristic group which has ot been subjected to data modification.

Finally, it should be noted that the principle of the present invention may be embodied not only as a method invention but also as a apparatus or device invention. Further, the principle of the present invention may be implemented as a computer program, as well as a storage or recording medium containing such a computer program. Further, a recording medium containing main information processed by the "electronic watermarking" scheme via the method or device of the present invention should also be construed as falling within the scope of the present invention.

BRIEF DESCRIPTION OF THE DRAWINGS

For better understanding of the above and other features of the present invention, the preferred embodiments of the invention will be described in greater detail below with reference to the accompanying drawings, in which:

FIG. 5 is a conceptual diagram in the form of orthogonal coordinates showing exemplary relationship between additional information and key code and velocity, where the vertical axis represents key code values while the horizontal axis represents velocity values and where the originating point of the coordinates is defined by an intersection between a vertical center line passing between predetermined velocity values and a horizontal center line between predetermined key code values;

FIG. 6 is a diagram showing detailed relationship between additional information and key code and velocity;

FIG. 7 is a diagram showing exemplary contents of scramble decoding data to be embedded in MIDI data;

FIG. 10 is a flowchart showing still another example of the MIDI data editing process ("MIDI data editing process 3") when the electronic musical instrument operates as the electronic information processing system;

DETAILED DESCRIPTION OF THE PREFERRED EMBODIMENTS

Figure 2:
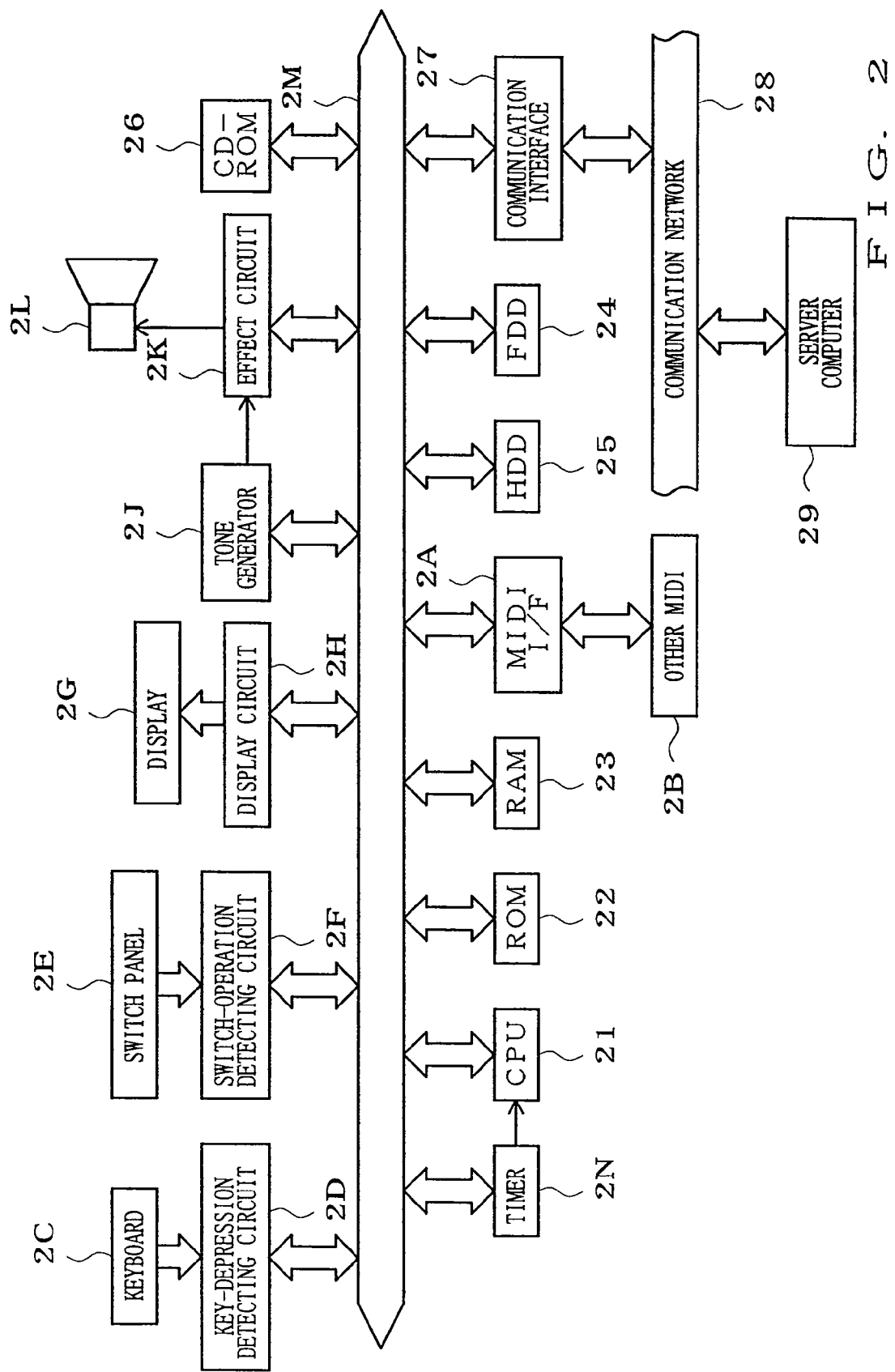
FIG. 2 is a block diagram illustrating a general hardware structure of an electronic musical instrument that is designed to operate as the electronic information processing system of the present invention.

FIG. 2 is a block diagram illustrating a general hardware structure of an electronic musical instrument that operates as an electronic information processing system of the present invention. The electronic musical instrument includes a microprocessor unit (CPU) 21, to which are connected various elements via an address and data bus 2M as will be described below.

The CPU 21 controls overall operations of the electronic musical instrument on the basis of various programs and data stored in a ROM 22 and RAM 23 as well as tone control information (MIDI data) received via external storage devices. The CPU 21 also works to store additional information dispersedly in received MIDI data, fetch MIDI data with such additional information from a floppy disk, detect the additional information from among the MIDI data. Whereas this embodiment is described in relation to the case where a floppy disk drive 24, hard disk drive 25 and CD-ROM 26 are employed as the external storage devices, any other disk drive, such as a MO (Magneto Optical) disk drive or PD (Phase change Disk) may be employed in the electronic musical instrument 1. Further, various information, such as tone control information, may be received via a communication interface 27 from a communication interface 27 on a communication network 28, and MIDI data may be received via a MIDI interface 2A from another MIDI instrument 2B.

The CPU 21 supplies a tone generator circuit 2J with MIDI data received from the external storage device or generated by a keyboard 2C in response to key depressing operation by a human player so that the tone generator circuit 2J generates a tone on the basis of the MIDI data. Alternatively, tone generating processing may be executed by use of an external tone generator.

The ROM 22, which is a read-only memory (ROM), has prestored therein various programs (including system and operating programs) and various data. The RAM 23, which is for temporarily storing data generated as the CPU 21 executes a program, is provided in predetermined address regions of a random access memory (RAM) and used as registers, flags, buffers, tables, etc.

Further, the operating program may be prestored in the external storage device such as the hard disk device 25. By prestoring the operating program in the hard disk device 25 rather than in the ROM 22 and loading the operating program into the RAM 23, the CPU 21 can operate in exactly the same way as where the operating program is stored in the ROM 22. This arrangement greatly facilitates version-up of the operating program, addition of a new operating program, etc. A CD-ROM may be used as a removably-attachable external recording medium for recording various data, such as automatic performance data, chord progression data, tone waveform data and image data, as well as an optional operating program. Such an operating program and data stored in the CD-ROM can be read out by the CD-ROM drive 26 to be then transferred for storage in the hard disk device 25. This arrangement also facilitates installation and version-up of the operating program.

The communication interface 27 may be connected to the address and data bus 2M so that the electronic musical instrument can be connected via the interface 27 to any communication network, such as a LAN (Local Area Network), Internet and telephone line, to exchange data with an appropriate sever computer 29. Thus, in a situation where the operating program and various data are not contained in the hard disk device 25, these operating program and data can be downloaded from the server computer 29. In such a case, the electronic musical instrument, which is a "client" tone generating device or automatic performance device, sends a command requesting the server computer to download the operating program and various data by way of the communication interface 27 and communication network 28. In response to the command, the server computer 29 delivers the requested operating program and data to the automatic performance device via the communication network 28. The automatic performance device receives the operating program and data via the communication interface 27 and accumulatively stores them into the hard disk device 25. In this way, the necessary downloading of the operating program and various data is completed.

Note that the present invention may be implemented by a commercially-available personal computer or the like having prestored therein the operating program and various data. In this case, the operating program and various data may be supplied to users in a form recorded on a recording medium, such as the CD-ROM 26 or floppy disk, readable by a personal computer. Where the personal computer or the like is connected to a communication network, such as a LAN (Local Area Network), Internet and telephone line, the operating program and various data may be supplied to that personal computer or the like.

The keyboard 2C includes a plurality of keys for designating a pitch of each tone to be generated and a plurality of key switches provided in corresponding relation to the keys and may also include a key-touch detector such as a key-depression force detector. Whereas the embodiment will be described as employing the keyboard 2C that is a fundamental musical performance operator device relatively easy to understand, any other performance operator device may be employed.

Key-depression detecting circuit 2D includes key switch circuits provided in corresponding relation to the individual pitch-designating keys of the keyboard 2C. The key-depression detecting circuit 2D thus arranged outputs key-on event data upon detecting a change from a key-released state to a key-depressed state of the keyboard 2C and outputs key-off event data upon detecting a change from a key-depressed state to a key-released state of the keyboard 2C. The key-depression detecting circuit 2D also outputs note numbers indicative of respective pitches of the keys where the key-on event and key-off event have occurred. In addition, the key-depression detecting circuit 2D identifies a velocity and force of player's key depression to output velocity data and after-touch data.

Switch panel 2E is provided with an automatic performance start/stop switch, a pause switch, and a plurality of other switches or operators for selecting, setting and controlling color (timbre), volume, effect, etc. of tones to be generated. Switch-operation detecting circuit 2F is provided in corresponding relation to the switches on the switch panel 2E and outputs switch event data corresponding to operating states of these switches to the CPU 21 via the bus 2M.

Display circuit 2H visually displays various pieces of information, such as controlling conditions of the CPU 21 and contents of currently set data, on a display 2G. Specifically, this display circuit 2H in the present embodiment visually displays copyright indication, title, composer, date of creation, lyrics, etc. of a music piece, latest news, model name of the device (hardware model name), text data such as ID data, and so forth. The display 2G, which is, for example, a liquid crystal display (LCD) panel, is controlled by the display circuit 2H.

The tone generator circuit 2J, which is capable of simultaneously generating tone signals in a plurality of channels, receives tone control information (MIDI data including a note-on or note-off instruction, velocity data, pitch data and tone color number) and generates a tone signal based on these data. The tone generation channels to simultaneously generate a plurality of tone signals in the tone generator circuit 2J may be implemented by using a single circuit on a time-divisional basis or by providing a separate circuit for each of the channels. Any tone signal generation method may be used in the tone generator circuit 2J depending on an application intended. For example, any conventionally known tone signal generation method may be used such as: the memory readout method where tone waveform sample value data stored in a waveform memory are sequentially read out in accordance with address data that vary in correspondence to the pitch of a tone to be generated; the FM method where tone waveform sample value data are obtained by performing predetermined frequency modulation operations using the above-mentioned address data as phase angle parameter data; or the AM method where tone waveform sample value data are obtained by performing predetermined amplitude modulation operations using the above-mentioned address data as phase angle parameter data. Other than the above-mentioned, the tone generator circuit 2J may also use the physical model method where a tone waveform is synthesized by algorithms simulating a tone generation principle of a natural musical instrument; the harmonics synthesis method where a tone waveform is synthesized by adding a plurality of harmonics to a fundamental wave; the formant synthesis method where a tone waveform is synthesized by use of a formant waveform having a specific spectral distribution; or the analog synthesizer method using VCO, VCF and VCA. Further, the tone generator circuit 2J may be implemented by a combined use of a DSP and microprograms or of a CPU and software programs, rather than by dedicated hardware.

Figure 3:
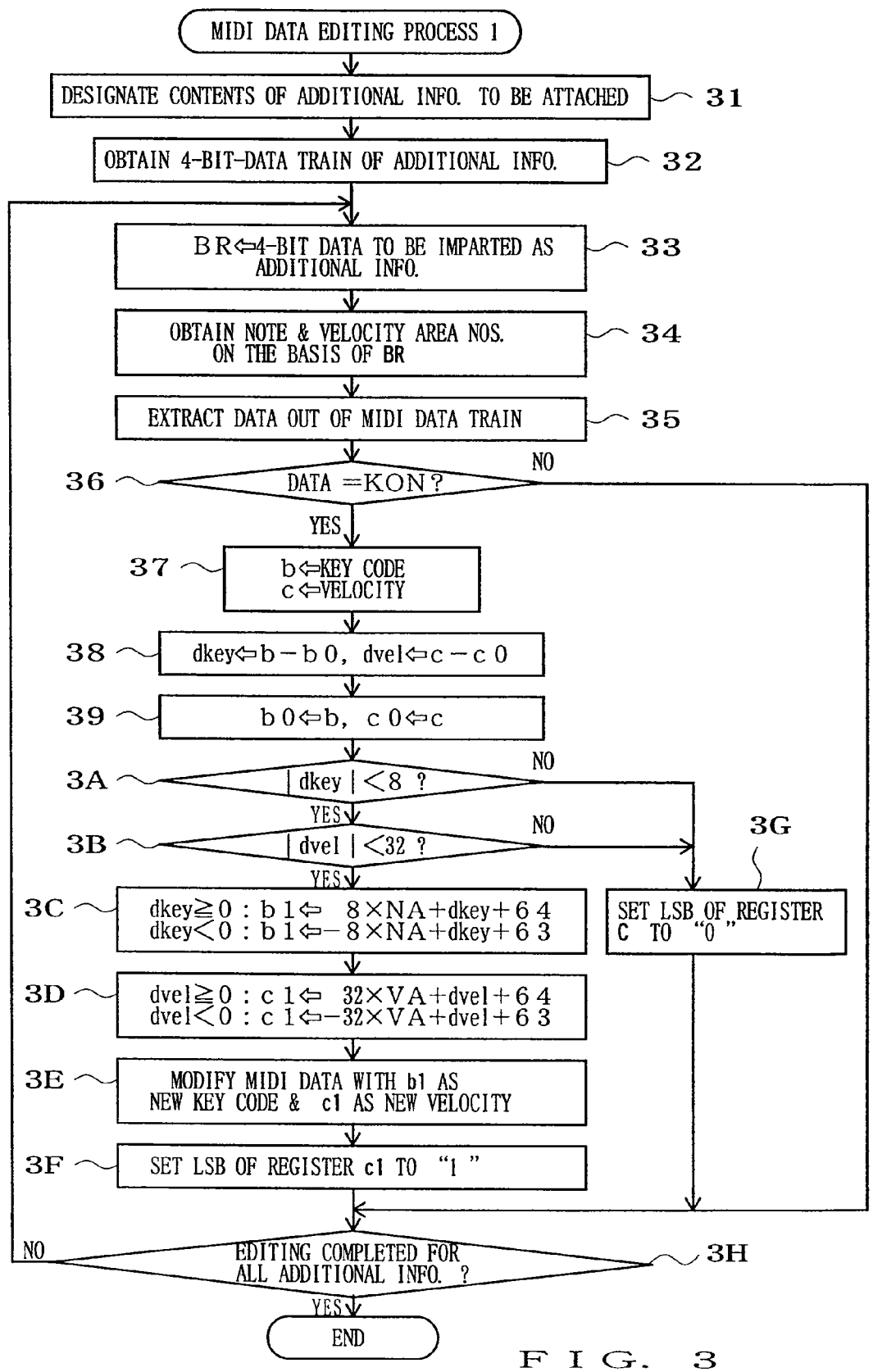
FIG. 3 is a flowchart showing an example of MIDI data editing process 1 executed when the electronic musical instrument of FIG. 2 operates as the electronic information processing system.

Timer 2N generates tempo clock pulses for counting a time interval and setting an automatic performance tempo. The frequency of the tempo clock pulses may be set via a tempo setting switch on the switch panel 2E or on the basis of tempo data previously included in performance data as shown in FIG. 3. Each tempo clock pulse generated by the timer 2N is fed to the CPU 21 as an interrupt instruction, in response to which the CPU 21 interruptively carries out various operations in an automatic performance.

Effect circuit 2K imparts various effects to tone signals generated by the tone generator circuit 2J and supplies the resultant effect-imparted tone signals to a sound system 2L, which audibly reproduces or sounds them via amplifiers and speakers.

Now, a description will be made about exemplary behavior of the electronic information processing system when it simultaneously executes electronic information imparting processing and coding processing.

FIG. 3 is a flowchart showing an example of a MIDI data editing process ("MIDI data editing process 1") executed in the case where the electronic musical instrument operates as an electronic information processing system. As will be described in detail below, the electronic musical instrument, in this case, dispersedly attach electronic signature data (i.e., copyright indication data) to MIDI data, read out from a floppy disk via the floppy disk drive 24, as part of its header information, and it also executes encoding processing on the MIDI data while still maintaining the original MIDI format.

First, at step 31, contents of additional information to be dispersedly written within the MIDI data train are designated. The embodiment will be described hereinafter in relation to the case where electronic signature data (copyright indication data) are embedded or incorporated dispersedly in the MIDI data train. If characters, such as "COPYRIGHT.DELTA.YMH.DELTA.1996", are to be dispersedly written in the MIDI data train as the copyright indication data, these characters are entered at step 31 using the switch panel 2E. In this instance, the mark ".DELTA." represents a blank space.

Once the electronic signature, i.e., character train to be written has been designated at step 31 in the above-mentioned manner, a four-bit-data train relating to the electronic signature is obtained at next step 32. If the above-noted characters "COPYRIGHT.DELTA.YMH.DELTA.1996" have been entered using the switch panel 2E, then they are converted into a data train of letters and marks in ASCII (American Standard Code for Information Interchange) codes.

Thus, in this instance, the characters "COPYRIGHT.DELTA.YMH.DELTA.1996" are expressed by an ASCII data train composed of "43H" ("C"), "4FH" ("O"), "50H" ("P"), "59H" ("Y"), "52H" ("R"), "49H" ("I"), "47H" ("G"), "48H" ("H"), "54H" ("T"), "20H" (".DELTA."), "59H" ("Y"), "4DH" ("M"), "48H" ("H"), "20H" (".DELTA."), "31H" ("1"), "39H" ("9"), "39H" ("9") and "36H" ("6"), where the letter "H" attached to the end of the numbers indicates that the numbers are in the hexadecimal representation.

Figure 1:
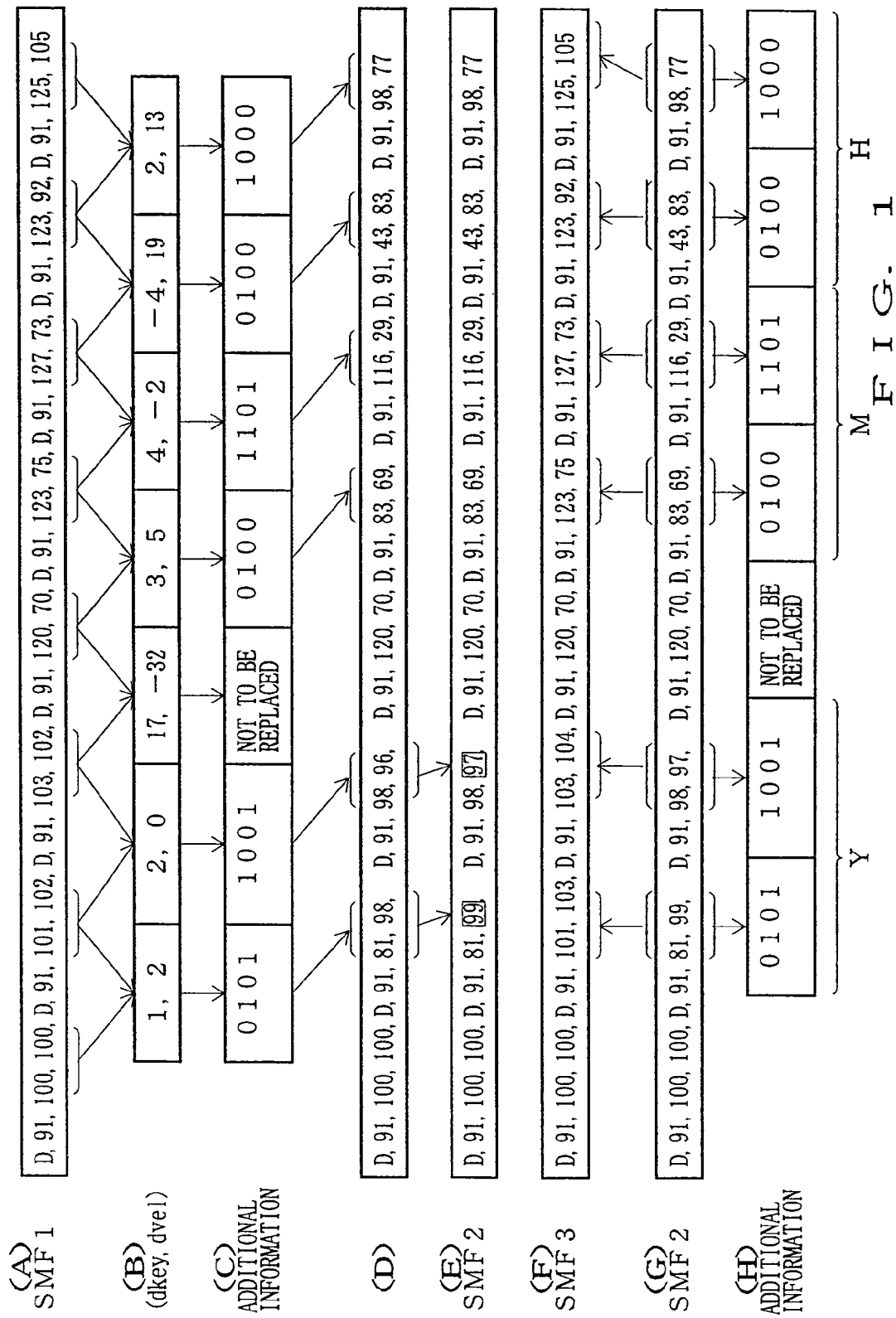
FIG. 1 is a diagram showing an exemplary manner in which data are converted through MIDI data editing process 1 and MIDI data restoring process 1 by an electronic information processing system according to an embodiment of the present invention.

Then, at step 33, the ASCII four-bit-data train obtained at step 32, to be imparted as the electronic signature, is stored into a four-bit register BR. If "59H" ("Y"), "4DH" ("M") and "48H" ("H") are to be sequentially written in the MIDI data train, then four-bit data "0110B", "1001B", "0100B", "1110B", "0100B" and "1000B" as shown at block (C) of FIG. 1 are sequentially stored into the four-bit register BR. Here, the letter "B" attached to the end of the numbers indicates that these numbers are in the binary representation.

At subsequent step 34, the upper three bits stored in the four-bit register BR are set as a note area number NA, and the least significant bit (LSB) is set as a velocity area number VA. Thus, NA=2 and VA=1 for the first four bits "0110B" of the signature letter "Y" (=59H), and NA=4 and VA=1 for the last four bits "10001B" of that signature letter; NA=2 and VA=0 for the first four bits "0100B" of the signature letter "M" (=4DH), and NA=6 and VA=1 for the last four bits "1100B" of that signature letter; and NA=2 and VA=0 for the first four bits "0100B" of the signature letter "H" (=48H), and NA=4 and VA=0 for the last four bits "10001B" of that signature letter.

At next step 35, various MIDI data, such as key-on event data, program change data and control change data, are sequentially extracted out of the MIDI data train (Standard MIDI File: SMF). The MIDI data train basically comprises key-on event data including a key-on status byte, key code byte and velocity byte, program change data and control change data, and hence step 35 sequentially reads out or extracts these data in a sequential manner.

Then, a determination is made at step 36 as to whether the currently extracted data is key-on event data KON. If answered in the affirmative (YES determination), the program proceeds to next step 37; otherwise (NO determination), the program branches to step 3H. Thus, if the MIDI data extracted at step 35 is key-on event data KON, there will be obtained a MIDI data train SMF1 including the key-on event data as denoted at block (A) of FIG. 1; this MIDI data train SMF1 comprises combinations of duration time data D and key-on event data.

At following step 37, the respective data of the individual bytes of the key-on event data are stored into corresponding registers b and c; that is, the value represented by the key code byte in the key-on status byte is stored into the current key code register b, and the velocity value represented by the velocity byte into the current velocity register c.

At next step 38, differences are calculated between the key code and velocity values of the last key-on event data and those of the current key-on data, and the thus-calculated differences are stored into a key code difference register dkey and velocity difference register dvel, respectively. More specifically, the key code of the current key-on event data is stored into the current key code register b, while the key code of the last key-on event data is stored into the last-key-code register b0. Then, the difference evaluated by subtracting the stored value of the last-key-code register b0 from the stored value of the current key code register b is stored into the key code difference register dkey. Similarly, the velocity of the current key-on event data is stored into the current velocity register c, while the velocity of the last key-on event data is stored into the last-velocity register c0. Then, the difference evaluated by subtracting the stored value of the last-velocity register c0 from the stored value of the current velocity register c is stored into the velocity difference register dvel. In the case of the MIDI data train SMF1 shown at block (A) of FIG. 1, differences as shown at block (B) of FIG. 1 will be stored into the key code difference register dkey and velocity difference register dvel.

At step 39, the current key code value stored in the register b is set into the last-key-code register b0 and the current velocity value stored in the register c is set into the last-velocity-value register c0, in readiness for next execution of step 38.

At next step 3A, a determination is made as to whether the stored value in the key code difference register dkey is smaller than "8". If the stored value in the key code difference register dkey is smaller than "8" (YES), the program proceeds to step 3B; otherwise, the program branches to step 3G. At step 3B, a determination is made as to whether the stored value in the velocity difference register dvel is smaller than "32". If the stored value in the velocity difference register dvel is smaller than "32" (YES), the program proceeds to step 3C; otherwise, the program branches to step 3G. Namely, when a negative determination has been made at both step 3A and step 3B, it is judged that the current key-on event data is not to be replaced, and the least significant bit in the current velocity register c is changed to "0", i.e., the velocity value is changed to an even number, at step 3G. After step 3G, the program goes to step 3H. Thus, velocity values in even numbers, indicating that the key-on event data is not to be replaced, greatly facilitate determination, at the time of a later-described data restoring process, that the key-on event data has not been modified.

At step 3C following step 3B, different replacing arithmetic operations are carried out depending on whether the stored value in the key code difference register dkey is a positive value or zero, or a negative value. If the stored value in the key code difference register dkey is a positive value or zero, the note area number NA is multiplied by "8" and added with the stored value in the key code difference register dkey and a constant "64", and then the resultant sum is stored into a first key code register b1. Because the maximum and minimum values of the three-bit note area numbers NA are "7" and "0", respectively, the possible minimum stored value of the register b1 under this condition will be "64". If, on the other hand, the stored value in the key code difference register dkey is a negative value, the note area number NA is multiplied by "8" and added with the stored value in the key code difference register dkey and a constant "63", and then the resultant sum is stored into the first key code register b1; because the stored value in the key code difference register dkey is in a negative value, adding the stored key code difference with the constant "63" is equivalent to subtracting the stored key code difference from the constant "63". Under this condition, the first key code register b1 will not store values greater than "63".

At step 3D following step 3C, different replacing arithmetic operations are carried out depending on whether the stored value in the velocity difference register dvel is a positive value or zero, or a negative value. If the stored value in the velocity difference register dvel is a positive value or zero, the velocity area number VA is multiplied by "32" and added with the stored value in the velocity difference register dvel and a constant "64", and then the resultant sum is stored into a first velocity register c1. The possible minimum stored value of the register b1 under this condition will be "64". If, on the other hand, the stored value in the velocity difference register dvel is a negative value, the velocity area number VA is multiplied by "32" and added with the stored value in the velocity difference register dvel and a constant "63", and then the resultant sum is stored into the first velocity register c1; because the stored value in the velocity difference register dvel is in a negative value, adding the stored velocity difference with the constant "63" is equivalent to subtracting the stored velocity difference from the constant "63". Under this condition, the register c1 will not store values greater than "63".

At step 3E, the MIDI data is modified in such a manner that the stored value in the first key code register b1 is set as a new key code value and the stored value in the first velocity register c1 is set as a new velocity value.

Then, the least significant bit in the first velocity register c1 is changed to "1", i.e., the velocity value is changed to an odd number, at next step 3F, and the program proceeds to step 3H. Thus, velocity values in odd numbers greatly facilitate determination, at the time of the restoring process, that the key-on event data has been modified on the basis of additional information.

At step 3H, it is determined whether the operations of steps 33 to 3G have been completed for all of the additional information. If answered in the affirmative (YES), this MIDI data editing process is brought to an end, but if answered in the negative (NO), the program loops back to step 33 in order to carry out the same series of operations for the next additional information.

For example, the first key-on event data (91, 100, 100) in FIG. 1 is not modified because there is no preceding key-on data. The second key-on event data (91, 101, 102) is modified, through the MIDI data editing process of FIG. 3, into key-on event data (91, 81, 99) as denoted at block (E) of FIG. 1. In a similar manner, the third key-on event data (91, 103, 102) is modified into key-on event data (91, 98, 97) as denoted at block (D) of FIG. 1. In the case of the fourth key-on event data (91, 120, 70), a negative determination is made at step 3A of the MIDI data editing process now that the absolute value of the stored content of the key code difference register dkey is "17" greater than the value "8" as denoted at block (B) of FIG. 1. Thus, the fourth key-on event data (91, 120, 70) is considered to not be replaced and directly set, by way of step 3G, as fourth key-on event data (91, 120, 70) as denoted at block (D) of FIG. 1. Then, the fifth to eighth key-on event data are modified into fifth to eighth key-on event data as denoted at block (D) of FIG. 1. Note that the velocity values in the second and third key-on event data are changed into odd numbers via the operation of step 3F.

The program change event would occur less frequently than the note-on event to which is attached additional information and would involve a change from one musical instrument to another, and there is a great likelihood that the MIDI data editing will start at the point of the program change event. Thus, in the event the extracted MIDI data is program change event data, the MIDI data may be edited from the very first additional information.

FIG. 5 lists values that may be stored in the first key code and velocity registers b1 and c1 according to the first embodiment. Namely, FIG. 5 shows orthogonal coordinates where the vertical axis represents all key code values that may be stored in the first key code register b1 while the horizontal axis represents all velocity values that may be stored in the first velocity register c1 and where the originating point is defined by an intersection between a vertical center line passing between the velocity values "63" and "64" and a horizontal center line between the key code values "63" and "64".

This way, four different types of value polarity combination, of increasing and decreasing key code values (positive and negative values) and increasing and decreasing velocity values (positive and negative values), are allocated to four "quadrants", one combination to each quadrant. Sixteen four-bit data constituting additional information are allocated to each of the quadrants. Namely, as shown in FIG. 5, the first-type combination of increasing key code values and increasing velocity values, the second-type combination of increasing key code values and decreasing velocity values, the third-type combination of decreasing key code values and increasing velocity values, and the fourth-type combination of decreasing key code values and decreasing velocity values are allocated to the first to fourth quadrants, respectively.

Of each of the four-bit additional information allocated to one of the quadrants, the least significant bit is allocated to the horizontal velocity axis, while the upper three bits are allocated to the vertical key code axis. Thus, pieces of additional information with increasing key code and velocity values are allocated to the first quadrant of the orthogonal coordinates, in which case the value range from "64" to "127" on the key code axis is divided to correspond to eight pieces of additional information from "000" to "111" and the value range from "64" to "127" on the velocity axis is divided to correspond to two pieces of additional information "0" and "1". Pieces of additional information with increasing key code values and decreasing velocity values are allocated to the second quadrant of the orthogonal coordinates, in which case the value range from "64" to "127" on the key code axis is divided to correspond to eight pieces of additional information from "000" to "111" and the value range from "63" to "0" on the velocity axis is divided to correspond to two pieces of additional information "0" and "1". Further, pieces of additional information with decreasing key code and velocity values are allocated to the third quadrant of the orthogonal coordinates, in which case the value range from "63" to "0" on the key code axis is divided to correspond to eight pieces of additional information from "000" to "111" and the value range from "63" to "0" on the velocity axis is divided to correspond to two pieces of additional information "0" and "1". Finally, pieces of additional information with decreasing key code values and increasing velocity values are allocated to the fourth quadrant of the orthogonal coordinates, in which case the value range from "63" to "0" on the key code axis is divided to correspond to eight pieces of additional information from "000" to "111" and the value range from "64" to "127" on the velocity axis is divided to correspond to two pieces of additional information "0" and "1".

In this instance, the key codes of the individual additional information would take eight different values while the velocities of the individual additional information would take 32 different values as shown in FIG. 6, and there exists a condition that stored values in the key code difference value dkey must be smaller than "8" and stored values in the velocity difference value dvel must be smaller than "32".

Thus, if the key code value has increased or decreased by a quantity smaller than the value "8" and the velocity value has increased or decreased by a quantity smaller than the value "32", a selection is made from among the pieces of additional information allocated to the quadrants of FIG. 5, and the original key code and velocity are edited depending on the value of the selected additional information as well as the calculated key code and velocity differences. In this instance, the least significant bit of the velocity data is processed at steps 3G and 3F in order to indicate whether or not the velocity value is an edited value, so that the edited velocity value will take any one of 16 odd numbers.

Figure 4:
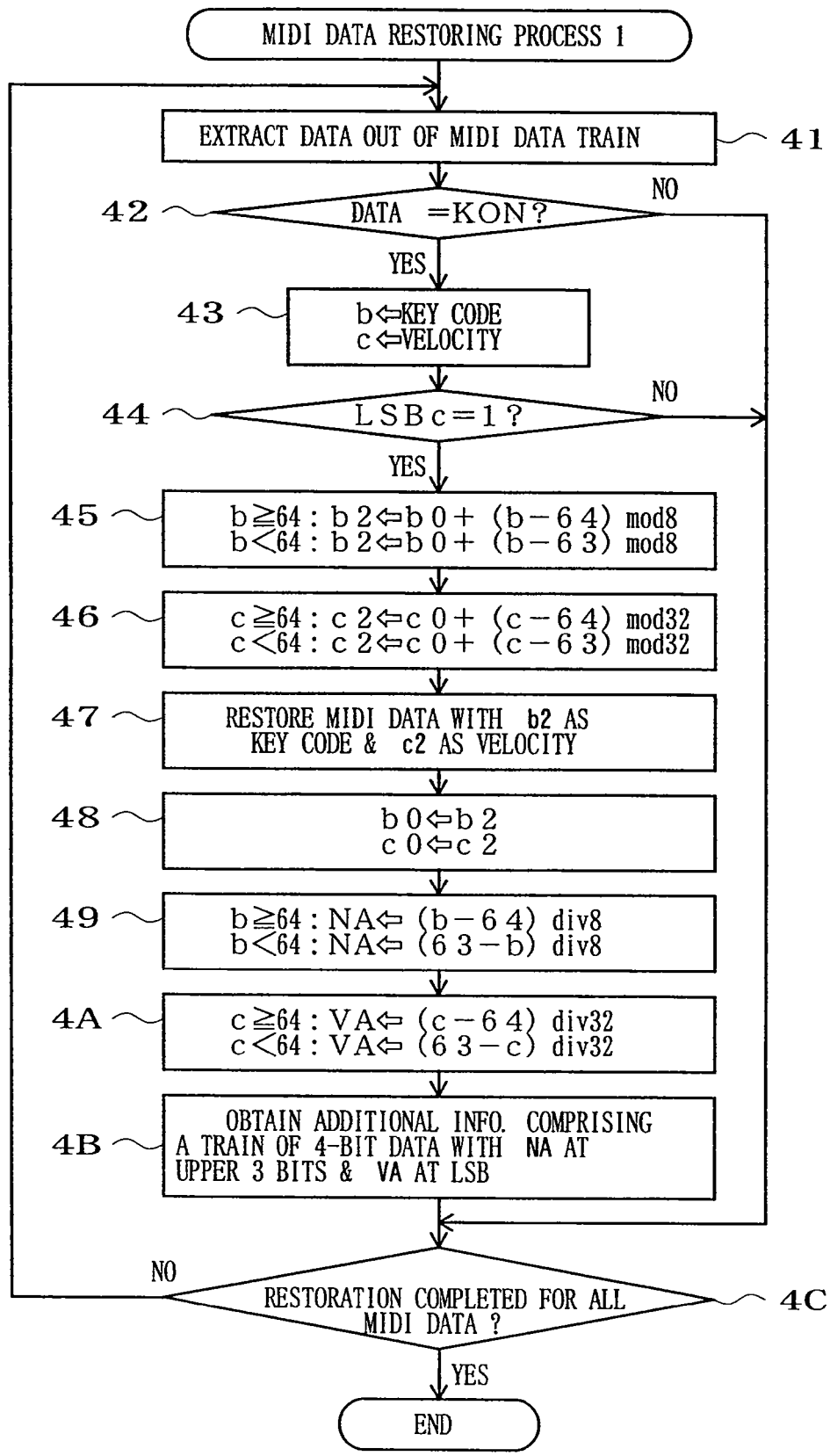
FIG. 4 is a flowchart showing an example of MIDI data restoring process 1 executed when the electronic musical instrument of FIG. 2 operates as the electronic information processing system.

Next, a description will be made about a MIDI data restoring process that is intended to detect or modify electronic information, i.e., electronic signature data, imparted by the MIDI data editing process of FIG. 3. FIG. 4 is a flow chart of a MIDI data restoring process ("MIDI data restoring process 1") showing exemplary behavior of the electronic musical instrument when it functions as a MIDI data restoring device. Let's assume here that part of header information as described above (electronic signature data, i.e., copyright indication data) has already been recorded dispersedly in the MIDI data read out from a floppy disk via the floppy disk drive 24. The following paragraphs describe various operations from detecting the copyright indication data up to displaying the detected copyright indication data on a monitor or the like.

First, at step 41, various data, such as key-on event data, program change data and control change data, are sequentially extracted out of the MIDI data train (Standard MIDI File: SMF) having the electronic signature imparted by the MIDI data editing process of FIG. 3.

At next step 42, a determination is made as to whether or not the extracted MIDI data is key-on event data KON. If the extracted MIDI data is key-on event data KON, the program proceeds to step 43; otherwise, the program jumps to step 4C. Thus, when the MIDI data extracted at step 41 is key-on event data KON, a MIDI key-on event data train SMF2 is created as denoted at block (F) of FIG. 1.

At step 43, the respective data of the individual bytes of the key-on event data are stored into the corresponding registers b and c; that is, the value represented by the key code byte in the key-on status byte is stored into the current key code register b, and the velocity value represented by the velocity byte into the current velocity register c.

At step 44, a determination is made as to whether or not the least significant bit of the current velocity register c represents the value "1", i.e., whether or not the key-on event data has additional information (electronic signature information) imparted thereto. With an affirmative (YES) determination, the program proceeds to step 45; otherwise, the program jumps to step 4C.

At subsequent steps 45, 46, 49 and 4A, values of a restored key code register b2 and restored velocity register c2, note area number NA, and velocity area number VA are calculated on the basis of the respective stored values in the current key code register b and last-key-code register b0 and current velocity register c and last-velocity register c0 for the last and current key-on event data. At this time, each of the above-mentioned values is calculated by use of different arithmetic operations depending on whether the stored value of the current key code register b is equal to or greater than "64" or smaller than "64".

More specifically, step 45 executes the reverse of the above-mentioned replacing arithmetic operations of step 3C. That is, if the stored value of the current key code register b is equal to or greater than "64", the key code difference value dkey is reproduced by subtracting the constant "64" from the stored value of the current key code register b and calculating "modulo 8" of the subtraction result (i.e., a remainder left from division of the subtraction result by the value "8"). Then, the reproduced key code difference value dkey is added to the last-key-code register b0 to thereby obtain a restored key code value, which is then stored into a restored key code register b2. If, on the other hand, the stored value of the current key code register b is smaller than "64", the key code difference value dkey is reproduced by subtracting the constant "63" from the stored value of the current key code register b and calculating "modulo 8" of the subtraction result. Then, the reproduced key code difference value dkey is added to the last-key-code register b0 to thereby obtain a restored key code value, which is then stored into a restored key code register b2.

Step 46 executes the reverse of the above-mentioned replacing arithmetic operations of step 3D. That is, if the stored value of the current velocity register c is equal to or greater than "64", the velocity difference value dvel is reproduced by subtracting the constant "64" from the stored value of the current velocity register c and calculating "modulo 32" of the subtraction result (i.e., a remainder left from division of the subtraction result by the value "32"). Then, the reproduced velocity difference value dvel is added to the last-velocity register c0 to thereby obtain a modified value of velocity data, which is then stored into a restored velocity register c2. If, on the other hand, the stored value of the current velocity register c is smaller than "64", the velocity difference value dvel is reproduced by subtracting the constant "63" from the stored value of the current velocity register c and calculating "modulo 32" of the subtraction result. Then, the reproduced velocity difference value dvel is added to the last-velocity register c0 to thereby obtain a modified value of velocity data, which is then stored into a restored velocity register c2.

At step 47 following step 46, the MIDI data is restored using the stored value in the restored key code register b2 as a restored key code value and the stored value in the modified velocity register c2 as a restored velocity value.

At next step 48, the restored key code value (i.e., the stored value in the restored key code register b2) is set into the last-key-code register b0 and similarly the restored velocity value (i.e., the stored value in the restored velocity register c2) is set into the last-velocity register Co.

Step 49 executes the reverse of the above-mentioned replacing arithmetic operations of step 3C in order to reproduce the note area number NA. That is, if the stored value of the current key code register b is equal to or greater than "64", the constant "64" is subtracted from the stored value of the current key code register b and the subtraction result is divided by "8", so as to set the division result (quotient) as the note area number NA. If the stored value of the current key code register b is smaller than "64", the stored value of the current key code register b is subtracted from the constant "63" and the subtraction result is divided by "8", so as to set the division result (quotient) as the note area number NA.

Next step 4A executes the reverse of the above-mentioned replacing arithmetic operations of step 3D in order to reproduce the velocity area number VA. That is, if the stored value of the current velocity register c is equal to or greater than "64", the constant "64" is subtracted from the stored value of the current velocity register c and the subtraction result is divided by "32", so as to set the division result (quotient) as the velocity area number VA. If the stored value of the current velocity register c is smaller than "64", the stored value of the current velocity register c is subtracted from the constant "63" and the subtraction result is divided by "32", so as to set the division result (quotient) as the velocity area number VA.

At following step 4B, additional information is obtained which comprises 4-bit data having the note area number NA at its upper three bits and the velocity area number VA at its least significant bit.

Further, at step 4C, it is ascertained whether all the MIDI data have been restored. If so, this MIDI data restoring process is terminated; otherwise, the program loops back to step 41 to carry out the MIDI data restoring process on next MIDI data. Note that although not specifically shown, the MIDI data restoring process further includes a step of visually displaying part of the header information (the electronic signature, i.e., copyright indication data) and the like on a monitor screen upon termination of the data restoring process.

For example, the key-on event MIDI data train SMF2 at block (E) of FIG. 1 is identical to the MIDI key-on event data train SMF2 at block (G) of FIG. 1, and a MIDI data train SMF3 as denoted at block (F) is restored on the basis of the train SMF2 at block (G) so as to extract the additional information as shown at block (G). First, the first key-on event data "91, 100, 100" at block (G) of FIG. 1 is directly set as key-on event data because the least significant bit of the velocity data is an even number "0". The second key-on event data "91, 81, 99" at block (G) of FIG. 1 is converted into the second key-on event data "91, 101, 103" as shown at block (F) by the MIDI data restoring process of FIG. 4 now that the velocity data has an odd number "1" at its least significant bit and greater than "64". Similarly, the third key-on event data "91, 98, 97" at block (F) of FIG. 1 is converted into the third key-on event data "91, 103, 104" as shown at block (F) by the MIDI data restoring process of FIG. 4. The fourth key-on event data "91, 120, 70" at block (G) of FIG. 1 is directly set as key-on event data because the least significant bit of the velocity data is an even number "0". Then, the fifth to eighth key-on event data at block (G) of FIG. 1 are converted into the fifth to eighth key-on event data as shown at block (F), respectively, in a similar manner to the second and third key-on event data. Note that the velocity values of the converted second and third key-on event data are greater, by one-two, than those of the second and third key-on event data at block (A) before the MIDI editing process because they have been converted by the operation of step 3F of FIG. 3. However, such velocity value differences do not have a substantial auditory effect on human listeners and hence can be said to be within an ignorable range.

Electronic signature information (copyright indication data) as shown at block (H) of FIG. 1 will be reproduced on the basis of the key-on event data at block (G) and will be visually shown on a display device (not shown).

Whereas the first embodiment has been described above in relation to the case where each four-bit additional information has one bit allocated to the velocity and three bits allocated to the key code, the additional information may of course be of any other bit combination; for example, two bits may be allocated to each of velocity and key code, or four bits may be allocated to the velocity alone.

Further, whereas the first embodiment has been described above in relation to the case where the note value range is divided into eight equal segments and the velocity value range is divided into two equal segments to record the four-bit additional information, the note and velocity value ranges may each be divided into any greater number of segments to thereby provide an increased total quantity of additional information. If each of the note and the velocity value ranges is divided into 16 equal segments, then eight-bit additional information can be attached to each key-on event data, and one ASCII-code byte can be expressed by one key-on event data. In this case, however, a problem would be encountered that no additional information can be attached to the key-on event data unless the stored values in the key code and velocity difference register dkey and dvel are four or less. Thus, frequencies in occurrence of the key code and velocity differences may be detected in advance so that the numbers of divided key code and velocity segments may be selected, depending on the previously detected occurrence frequencies, which allow for a maximum number of pieces of additional information. In this case, the encoding algorithm is modified, to some degree, depending on the number of bits of the additional information to be incorporated to one data unit of the main information. For example, in a situation where four-bit additional information is to be incorporated into note data, the coefficient "8" in the encoding algorithm is modified to "4" at step 3C of FIG. 3.

Furthermore, whereas the first embodiment has been described above in relation to the case where the relationship shown in FIG. 5 is given by mathematical expressions, a conversion table may be prepared to give such a relationship so that a predetermined value is determined through conversion using the table; in this case, the pieces of additional information may be arranged either in a well-organized manner as shown in FIG. 5 or in a random manner. Note that the above-mentioned table may be implemented by a gate logic circuit or software processing, rather than a memory device such as a ROM or RAM.

Moreover, in the above-described first embodiment, electronic signature data, i.e., copyright indication data, which is part of header information of MIDI data read out from a floppy disk via the floppy disk drive 24, are dispersedly stored in relatively large data units in key-on event data thereof, and the encoding ("electronic watermarking") process is executed while still maintaining the MIDI format. With this arrangement, however, contents of the key code and velocity in some of the key-on event data would be rewritten almost entirely, and thus tones would be reproduced quite randomly even when a MIDI data reproduction process is performed without applying the predetermined MIDI data restoring process.

Thus, a second embodiment of the present invention to be described hereinbelow is designed to carry out the electronic watermarking process in a manner different from the first embodiment. The second embodiment is characterized by embedding, in the leading portion of MIDI data, scramble decoding data indicating which of a plurality of different encoding procedures has been employed, allowing normal MIDI data reproduction to be performed on the leading portion without the encoding process, and subjecting the other MIDI data portion to a scrambling process, corresponding to the scramble decoding data, to prevent unauthorized reproduction of the MIDI data.

FIG. 7 is a diagram showing exemplary contents of the scramble decoding data to be embedded in the MIDI data according to the second embodiment. The scramble decoding data in this example consists of two bytes, where the upper four bits of the first byte represent an associated algorithm, the lower four bits of the first byte represent a specific number of events to be subjected to the scrambling process ("count") and the eight bits of the second byte represent a numerical "value" corresponding to the algorithm.

Examples of the algorithm include one for modifying a note number of key-on data, one for replacing a note and velocity of key-on data with others, one for modifying interval data, and one for modifying channel data of key-on data. The "count" indicates how many of first key-on event data necessary for creating two ASCII characters, i.e., 16-bit data, are to be subjected to the scrambling process.

Whereas the first embodiment has been described as allowing four-bit data to be embedded in every key-on event data (and hence allowing additional information, corresponding to one ASCII character, to be embedded in every two key-on event data), the second embodiment will be described below in relation to a case where only one-bit data is embedded in every key-on event data and hence the maximum number of events to be modified is "16". The "value" differs depending on the corresponding algorithm. That is, with the algorithm for modifying a note number of key-on data, the value represents a degree of the note change, i.e., a transpose value (modified note value); with the algorithm for modifying interval data, the value represents a modified interval data value; and with the algorithm for modifying channel data of key-on data, the value represents a modified channel value. Let's assume here that a total of 16 different algorithms are prescribed in the embodiment. Note that the 16 algorithms may of course include one for the scrambling process as carried out in the above-described first embodiment.

Figure 8:
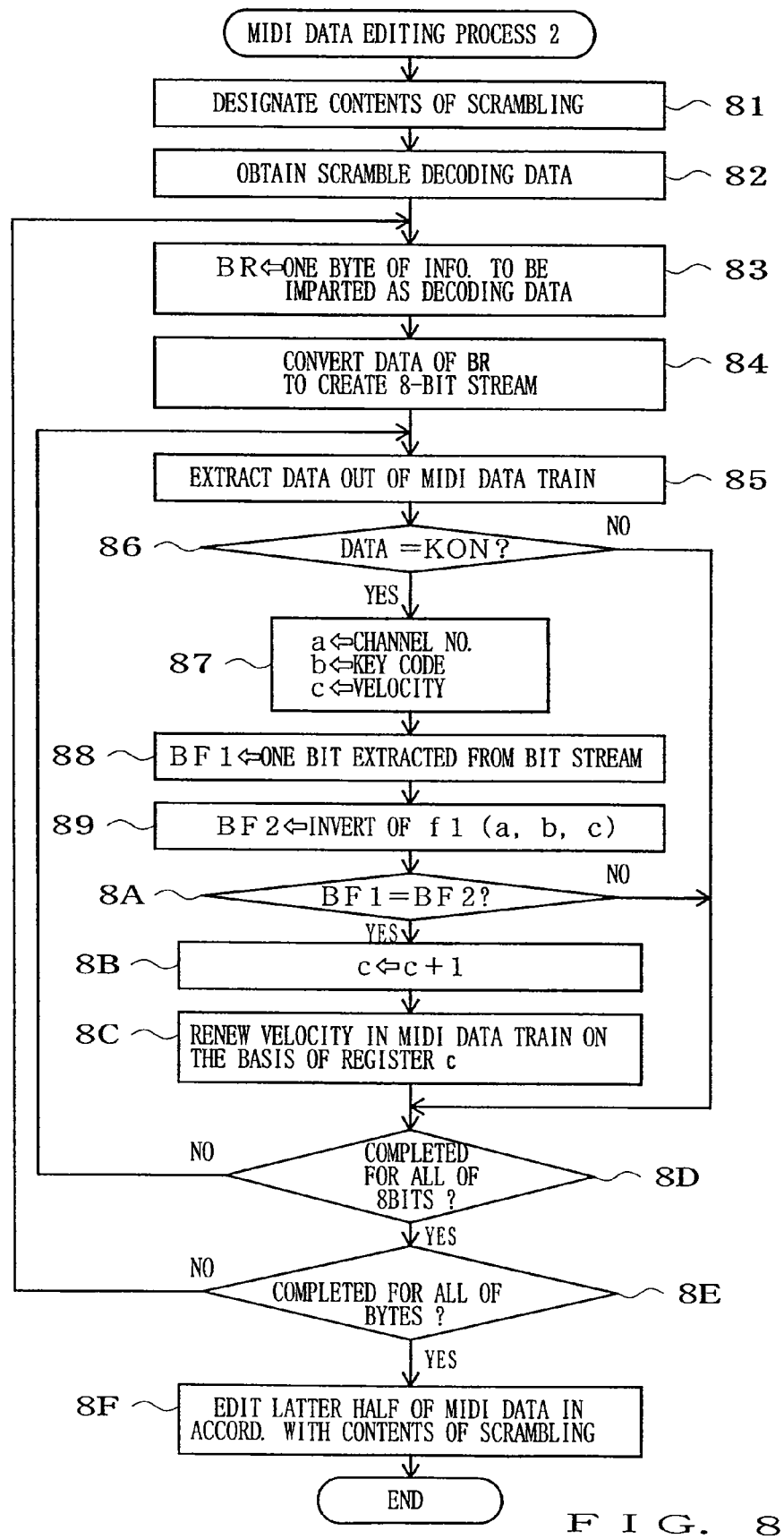
FIG. 8 is a flowchart showing another example of the MIDI editing process ("MIDI editing process 2") executed when the electronic musical instrument operates as the electronic information processing system.

FIG. 8 is a flowchart showing another example of the MIDI editing process ("MIDI editing process 2") executed in the case where the electronic musical instrument operates as an electronic information processing system. As will be described in detail below, the electronic musical instrument, in this case, dispersedly attach electronic signature data (i.e., copyright indication data) to MIDI data, read out from a floppy disk via the floppy disk drive 24, as part of its header information and also attach thereto 16-bit scramble decoding data.

First, at step 81 of the MIDI data editing process, contents of scramble data to be dispersedly written in the MIDI data train are designated. Assume here that a particular one of the algorithms to be used for the scrambling process has already been set by the user via the switch panel 2E.

Once the contents of the scramble have been designated, the program proceeds to step 82 to provide a decoding data train for the scrambling. If the fifth algorithm is selected via the switch panel 2E, then a train of eight-bit data, consisting of data "0111B" indicative of the type of the algorithm and count "1001B", will be recorded dispersedly in the MIDI data train as a scramble decoding data train.

Then, at step 83, one byte of the scramble decoding data provided at step 82 is stored into the byte register BR. At next step 84, each bit of the scramble decoding data thus stored in the byte register BR is inverted to provide another eight-bit stream. For example, if the stored scramble decoding data train is "0011001B" as shown at block (F) of FIG. 12, it will be converted, via the bit inversion, into a bit stream "10100110B" as shown at block (E) of FIG. 12.

At next step 85, various MIDI data, such as key-on event data, program change data and control change data, are sequentially extracted out of the MIDI data train (Standard MIDI File: SMF). Because the MIDI data train basically comprises key-on event data including a key-on status byte, key code byte and velocity byte, program change data and control change data as well known in the art, this step sequentially reads out or extracts these MIDI data in a sequential manner.

Then, a determination is made at step 86 as to whether the currently extracted data is key-on event data KON. If answered in the affirmative, the program proceeds to next step 87; otherwise, the program branches to step 8D. Thus, if the MIDI data extracted at step 85 is key-on event data KON, there is obtained a MIDI data train SMF1 including key-on event data as denoted at block (A) of FIG. 12; this MIDI data train SMF1 comprises combinations of duration time data D and key-on event data.

At following step 87, respective data of the individual bytes of the key-on event data are stored into the corresponding registers a, b and c; that is, a channel number in the key-on status byte is stored into the channel register a, a key code in the first data byte (key code byte) into the current key code register b, and velocity data in the second data byte (velocity byte) into the current velocity register C.

At next step 88, one bit data is extracted from the start bit of the bit stream created at step 84 and stored into a first bit flag BF1.

Figure 12:
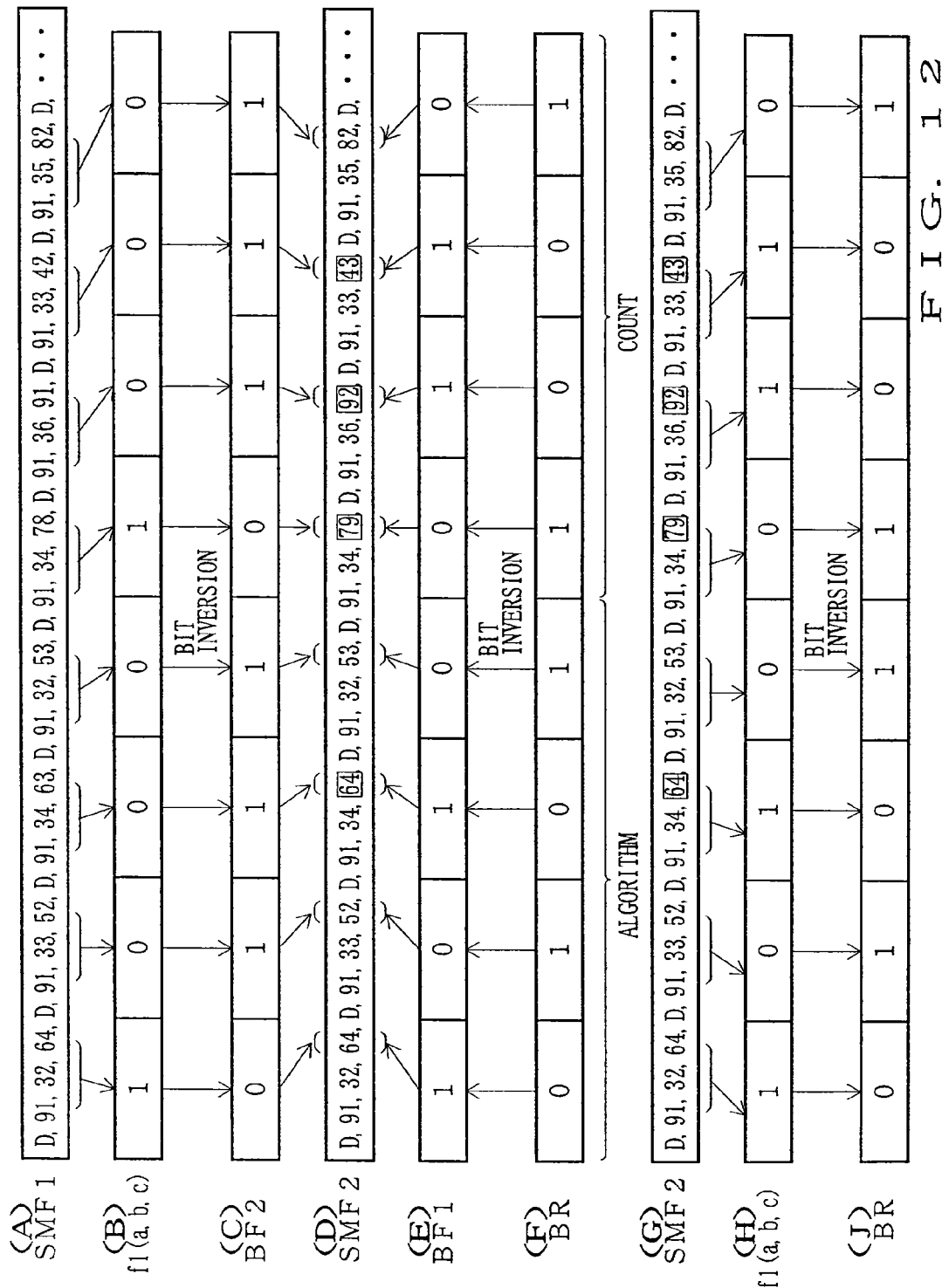
FIG. 12 is a diagram showing an exemplary manner in which data are converted through MIDI data editing process 2 and MIDI data restoring process 2 by the electronic information processing system according to the present invention.

At following step 89, the values stored in the registers a, b and c are subjected to arithmetic operations using a predetermined function, and each of the arithmetic operation results is then stored into a second bit flag BF2 after being subjected to a predetermined bit inversion operation. In this embodiment, modulo 2 of a sum of the values stored in individual registers a, b and c is set as the predetermined function; that is, function f1(a, b, c)=(a+b+c) mod 2. For example, in the case of the MIDI key-on event data train SMF1 as denoted at block (A) of FIG. 12, data corresponding to the algorithm and count of the scramble decoding data is created with eight key-on event data. By arithmetically operating the individual key-on data with the predetermined function f1(a, b, c), there is obtained a data train as denoted at block (B) of FIG. 12. Namely, if the sum (a+b+c) is an even number, a value "0" is given, while if the sum (a+b+c) is an odd number, a value "1" is given. Thus, the inverted data as denoted at block (C) of FIG. 12 are stored into the second bit flag BF2.

At next step 8A, a determination is made as to whether the values set in the first and second bit flags BF1 and BF2 at step 89 are equal to each other. With an affirmative (YES) determination, operations at following steps 8B and 8C are executed, while with a negative (NO) determination, the program jumps to step 8E.

If the values set into the first and second bit flags BF1 and BF2 are equal to each other as determined at step 8A, a value "1" is added, at step 8B, to the least significant (lowermost) bit of the value set in the current velocity register c. Then, at step 8C, the velocity value of the key-on event data in the MIDI data train is renewed on the basis of the value set in the register c; that is, the velocity value is incremented by one. In the example of FIG. 12, if the third, fifth, sixth and seventh values set in the first bit flag BF1 are equal to the corresponding values set in the second bit flag BF2, an affirmative determination results at step 8A, so that the velocity values of the third, fifth, sixth and seventh key-on event data are each incremented by one. More specifically, the velocity value "63" of the third key-on event data is incremented to "64", the velocity value "78" of the fifth key-on event data is incremented to "79", the velocity value "91" of the sixth key-on event data is incremented to "92", and the velocity value "42" of the seventh key-on event data is incremented to "43".

At step 8D, which is taken when a negative (NO) determination results at step 86 or 8A or after termination of step 8C, it is determined whether the operations of steps 85 to 8C have been completed eight times, i.e., for all of the eight bits. With an affirmative answer, the program moves on to step 8E, while with a negative answer, the program loops back to step 85 to carry out the operations of steps 85 to 8C for the next bit.

At step 8E, it is determined whether the operations of steps 83 to 8D have been completed for all of the bytes of the scramble decoding data. If the operations of steps 83 to 8D have been completed for all of the bytes, the program goes to step 8F; otherwise, the program reverts to step 83 in order to carry out the operations of steps 83 to 8D for the next byte of the scramble decoding data.

At step 8F, the scrambling process is performed on the latter half portion of the MIDI data train in accordance with the contents selected at step 81. For example, the scrambling process may be performed on key-on data right after the above-mentioned embedding of the scramble decoding data, or after lapse of a predetermined number of key-on event data from the embedding operation. Alternatively, the scrambling process may be performed after the embedding of the scramble decoding data has been carried out a plurality of times; if, in this case, the extracted MIDI data is program change event data PCM, the contents of the scrambling may be randomly restored and the MIDI data train editing process may be performed in accordance with the contents of the scramble decoding data embedding and scrambling. Because the program change event would occur less frequently than note-on event or the like and would involve a change from one musical instrument to another, it is preferred that the scrambling process be performed with the contents of the scrambling changed at the point of the program change and scramble decoding data for the changed contents embedded; this arrangement achieves a performance where no scrambling is applied to a given musical instrument while the intended scrambling is effected on the performance after lapse of a predetermined time.

Figure 9:
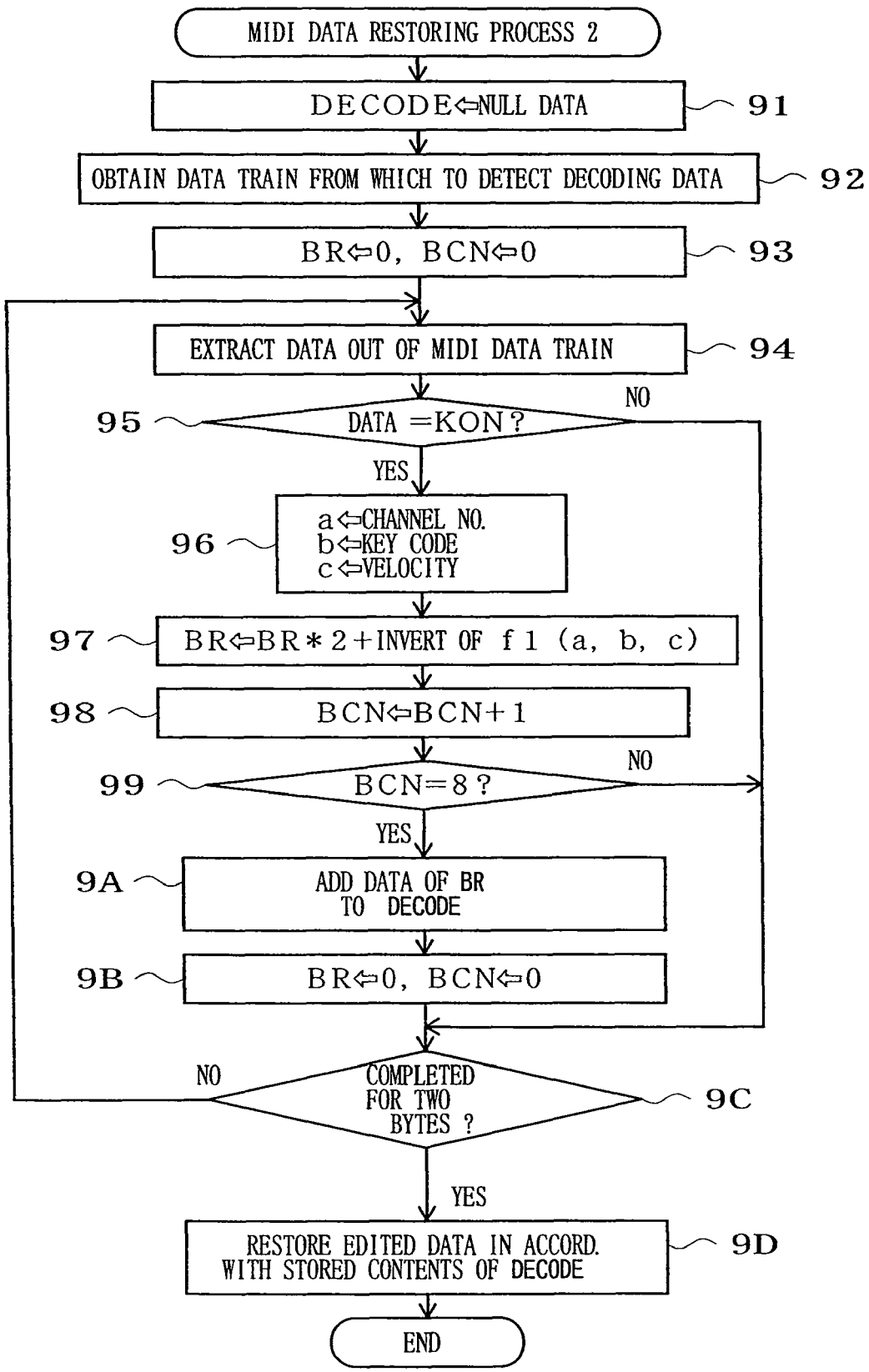
FIG. 9 is a flowchart showing another example of the MIDI data restoring process ("MIDI data restoring process 2") when the electronic musical instrument operates as the electronic information processing system.

Next, a detailed description will be made about a process for restoring the scramble decoding data imparted by the MIDI editing process of FIG. 8. Description on how to cancel the scrambled state will be omitted because it should be obvious the scrambled state can be easily cancelled by reversing the above-described operations in accordance with the associated algorithm. FIG. 9 is a flowchart showing another example of the MIDI data restoring process ("MIDI data restoring process 2") when the electronic musical instrument operates as a MIDI data restoring device. Assume here that electronic signature data (i.e., copyright indication data) and scramble decoding data are recorded dispersedly in the velocity byte sections of the MIDI data train read out from a floppy disk via the floppy disk drive 24, as part of its header information. The following paragraphs will describe operations from detecting the scramble decoding data up to restoring the MIDI data on the basis of the detected scramble decoding data.

First, at step 91, null data is set into a decode data register DECODE; that is, the decode data register DECODE is reset to "0".

Next step 92 takes out the MIDI data train from which the scramble decoding data is to be detected, i.e., the MIDI data train having scramble decoding data imparted thereto by the MIDI data editing process of FIG. 8.

Then, at step 93, the byte register BR and bit counter BCN are both reset.

At following step 94, various MIDI data, such as key-on event data, program change data and control change data, are sequentially extracted out of the MIDI data train (Standard MIDI File: SMF).

At next step 95, a determination is made as to whether the currently extracted MIDI data is key-on event data KON. If answered in the affirmative (YES), the program proceeds to next step 96; otherwise, the program branches to step 9C. Thus, if the MIDI data extracted at step 94 is key-on event data KON, there is obtained a MIDI key-on event data train SMF2 as denoted at block (G) of FIG. 12; the key-on event data train at block (G) is identical to the key-on event data train, denoted at block (D) of FIG. 12, having an electronic signature imparted thereto earlier.

At step 96, respective data of the individual bytes of the key-on event data are stored into the corresponding registers a, b and c; that is, a channel number in the key-on status byte is stored into the channel register a, a key code in the first data byte (key code byte) into the current key code register b, and velocity data in the second data byte (velocity byte) into the current velocity register c.

At next step 97, the value stored in the byte register BR is multiplied by two (shifted leftward) and then an inverted value of "function f1(a, b, c)=(a+b+c) mod 2" is added to the least significant (lowermost) bit of the multiplied value. Then, the value in the bit counter BCN is incremented by one at step 98, and it is further determined whether the incremented value in the bit counter BCN has reached a value "8". If answered in the affirmative at step 99, the program proceeds to step 9A; otherwise, the program jumps to step 9C.

For example, in the case of the MIDI key-on event data train SMF2 as denoted at block (G) of FIG. 12, one byte of scramble decoding data is created with eight key-on event data. By arithmetically operating the individual key-on data with the predetermined function f1(a, b, c), there is obtained a data train as denoted at block (H) of FIG. 12. Namely, if the sum (a+b+c) is an even number, a value "0" is given, while if the sum (a+b+c) is an odd number, a value "1" is given. These values are then inverted and sequentially shift the byte register BR so that one byte of scramble data as denoted at block (J) of FIG. 12 is ultimately set in the register BR.

The thus-obtained data of block (J) are identical to those of block (F) of FIG. 12. Namely, the copyright indication data written dispersedly in the velocity byte sections of the MIDI data train as denoted at block (F) have now been reproduced faithfully in the manner as shown at block (J) of FIG. 12.

At next step 9A, the stored value in the byte register BR is additionally stored into the decode data register DECODE. Then, at step 9B, the byte register BR and bit counter BCN are both reset.

At following step 9C, which is taken when the negative (NO) determination results at step 95 or after termination of step 9B, it is further determined whether the operations of step 94 to 9B have been completed for two bytes corresponding to the scramble decoding data. With an affirmative determination, the program moves on to step 9D, while with a negative determination, the program loops back to step 94 to repeat a series of the above-described operations. At step 9D, the MIDI data having undergone the scrambling process is restored on the basis of the scramble decoding data.

The second embodiment has been described above in relation to the case where key-on event data are sequentially extracted out of a MIDI data train and scramble decoding data are sequentially attached to the extracted key-on event data; however, such an arrangement can perform only one type of the scrambling process on each MIDI data train. This inconvenience may be eliminated by a third embodiment of the present invention which is designed to permit a different type of the scrambling process for each channel as will be described below.

FIG. 10 is a flowchart showing another example of the MIDI data editing process ("MIDI data editing process 3") when the electronic musical instrument operates as the MIDI data editing device. In this case, the electronic musical instrument operates to dispersedly attach scramble decoding and electronic signature data (i.e., copyright indication data) to MIDI data, read out from a floppy disk via the floppy disk drive 24, as part of its header information.

Step 101 designates respective contents of electronic signature data (copyright indication data) to be dispersedly written in the MIDI data train and scramble decoding data corresponding to the individual channels. If characters, such as "COPYRIGHT.DELTA.YMH.DELTA.1996", are to be dispersedly written in the MIDI data train as the copyright indication data, these characters are entered using the switch panel 2E. In this instance, the mark ".DELTA." represents a blank space.

Once the electronic signature, i.e., character train, and scramble decoding data to be written has been designated at step 101 in the above-mentioned manner, a data train relating to the electronic signature and scramble decoding data is obtained at next step 102. If the above-noted characters "COPYRIGHT.DELTA.YMH.DELTA.1996" have been entered using the switch panel 2E, then they are converted into a data train of letters and marks in ASCII codes.

Thus, in this instance, the characters "COPYRIGHT.DELTA.YMH.DELTA.1996" are expressed by an ASCII data train composed of "43H" ("C"), "4FH" ("O"), "50H" ("P"), "59H" ("Y"), "52H" ("R"), "49H" ("I"), "47H" ("G"), "48H" ("H"), "54H" ("T"), "20H" (".DELTA."), "59H" ("Y"), "4DH" ("M"), "48H" ("H"), "20H" (".DELTA."), "31H" ("1"), "39H" ("9"), "39H" ("9") and "36H" ("6"), where the letter "H" attached to the end of the numbers indicates that the numbers are in the hexadecimal representation. It should be obvious that the data train of these letters and marks can be embedded in MIDI data in a similar manner to the scramble decoding data as described in relation to the second embodiment. Thus, it is assumed that processes to be described below records the ASCII data train dispersedly in the MIDI data train in a similar manner to the above-described embedding of the scramble decoding data.

Namely, at next step 103, operations similar to the those of steps 83 to 8F in FIG. 8 are executed on the channel-by-channel basis, at which time the arithmetic operation based on the predetermined function is made different from one channel to another. For example, at step 89, the function f1(a, b, c)=(a+b+c)mod 2, which is stored in the second bit flag BF2, may be used as a first functional operation, and any suitable one of the first functional operation and the second, third and fourth functional operations as stated below may be used selectively for each of the channels:

second functional operation: f2(a, b, c) (a+c)mod 2;
third functional operation: f3(a, b, c)=(b+c)mod 2 and
fourth functional operation: f4(a, b, c)=(c)mod 2

Thus, at step 103, one of the first to fourth functional operations is selected as desired, for each of the channels, so as to redundantly or repeatedly combine, into the MIDI data, the electronic signature data and scramble decoding data that have been converted in accordance with the selected functional operation through the operations similar to those of steps 83 to 8F of FIG. 8.

By conducting a different functional operation for each of the channels in the above-mentioned manner, there is afforded the benefit that even when an editing operation involving simultaneous alteration of individual data of a specific channel, such as one involving substitution of channel information or key code shift, has been conducted, the electronic signature data and scramble decoding data can be restored from data of one or more other channels using the functions that are not related to the data of the specific channel altered by the editing.

Now, a description will be made about "MIDI data restoring process 3" for restoring the MIDI data having edited by the MIDI data editing process 3 of FIG. 10 with reference to FIG. 11, which is a flow chart showing an exemplary step sequence of MIDI data restoring process 3 when the electronic musical instrument operates as a MIDI data restoring device.

Let's assume here that for each of the channels of the MIDI data read out from a floppy disk via the floppy disk 24, electronic signature data, i.e., copyright indication and scramble decoding data are recorded, through any one of the first to fourth functional operations, dispersedly in the velocity byte sections of the MIDI data train as part of its header information. Thus, this MIDI data restoring process will be described in relation to a case where the musical instrument detects the dispersedly-recorded copyright indication data for each of the channels using a predetermined functional operation, displays the detected data on the monitor and restores the MIDI data on the basis of the scramble decoding data.

First, step 111 takes out a MIDI data train from which an electronic signature is to be detected, i.e., a MIDI data train having electronic signature and scramble decoding data imparted by MIDI data editing process 3 of FIG. 10 for each of the channels in accordance with a predetermined functional operation.

Then, a channel counter is reset at step 112, and a function counter is reset at step 113. Here, the channel counter and function counter are used to execute the functional operation for each of the channels in a subsequent process. For example, where there are 16 MIDI channels, the channel counter is caused to cyclically count from "0" to "15". Further, where there are four selectable functional operations as earlier noted, the function counter is caused to cyclically count from "0" to "3". If the function counter is at the value "0", this indicates the first functional operation $f1(a, b, c)=(a+b+c) \bmod 2$; if the function counter is at the value "1", this indicates the second functional operation $f2(a, b, c)=(a+c) \bmod 2$; if the function counter is at the value "2", this indicates the third functional operation $f3(a, b, c)=(b+c) \bmod 2$; and if the function counter is at the value "3", this indicates the fourth functional operation $f4(a, b, c)=(c) \bmod 2$.

At step 114, for the channel designated by the channel counter, an operation for detecting the electronic signature data and scramble decoding data is carried out, using a functional operation corresponding to the counted value of the function counter, in a manner similar to those of steps 91 to 9C of FIG. 9.

At following step 115, a determination is made as to whether the detected electronic signature data train includes any significant portion which, in this case, is part of the signature data "COPYRIGHT" comprised of ASCII text data. Thus, step 115 ascertains whether or not the letter data "COPYRIGHT" is present in the ASCII letter data train sequentially added to the decode data register DECODE through MIDI data restoring process 2 of FIG. 9. If the decode data register DECODE does not contain such a significant portion as determined at step 115, then the program proceeds to step 116 in order to increment the function counter by one. Then, at next step 117, a determination is made as to whether the operations of steps 114 and 115 for extracting the signature data and scramble decoding data have been completed for all of the functional operations. If so (YES), the program moves on to step 118, but if not (NO), the program loops back to step 114 in order to repeat the operations of steps 114 and 115 for the next functional operation. In the event that the decode data register DECODE contains such a significant portion as determined at step 115, the program goes to step 119 in order to restore the MIDI data on the basis of the scramble decoding data. Because the affirmative determination at step 115 means that the detected scramble decoding data is also significant, the original MIDI data can be recovered on the basis of the scramble decoding data. Note that the detected electronic signature data may of course be visually displayed on the monitor.

Further, the affirmative determination at step 117 means that no significant portion exists in the data train as a result of performing the signature data and scramble decoding data extraction using all the functional operations. Thus, next step 118 visually displays, on the monitor, letters such as "Detection of Electronic Signature Data and Scramble decoding Data Unsuccessful".

At following step 11A, the channel counter is incremented by one. Then, at next step 11B, a determination is made as to whether the data extracting operations of steps 114 and 115 have been completed for all of the channels. If so, the program terminates this MIDI data restoring process, but if not, the program loops back to step 113 in order to repeat the operations of steps 113 to 115 for the next MIDI channel.

Note that in a tone reproduction performance based on MIDI data, partly altered velocity data may be reproduced to be used directly for the performance. The least significant bit of the velocity data being incremented by one does not influence the reproducing accuracy so much. Of course, it is possible to reproduce accurately reproduce the partly altered velocity data with any error, caused by the signature data, removed from the velocity data.

Whereas the preferred embodiments have been made so far in relation to the case where the electronic signature data and scramble decoding data are dispersedly recorded in the velocity byte sections of a MIDI data train, this is just illustrative, and various other additional data, such as letter data representative of the author and title of a music piece or title of image data or a particular data format employed, may be dispersedly recorded.

Further, such additional data may be dispersedly recorded in the duration time sections in place of or in addition to the velocity byte sections. In the case where the additional data is dispersedly recorded in both the velocity sections and the duration time sections, exact locations where the additional data is to be recorded may be varied as necessary depending on a desired degree of data accuracy, i.e., a degree at which the contents of the data are varied by the disperse recording. More specifically, although it is not preferable to dispersedly record in the duration time sections where the duration time is relatively short because of increased data variation degree (data accuracy requirement), dispersed recording of the additional data will not have a significant influence in those duration time sections where the duration time is relatively long. Likewise, although it is not preferable to dispersedly record in the velocity sections where the velocity value is relatively small because of increased data variation degree (data accuracy requirement), dispersed recording of the additional data will not have a significant influence in those velocity sections where the velocity value is relatively great. Therefore, it is preferable that various necessary data be dispersedly recorded in velocity sections representing values greater than a predetermined value, taking these conditions into account.

Further, while the preferred embodiments have been described in relation to the case where the additional data is dispersedly recorded in the MIDI data, they may be dispersedly recorded in other data such as waveform data, sequence data, digitally recorded sound data, image data, moving data, registration data (recorded settings of the musical instrument) or the like.

Where the additional data is to be recorded in waveform data, the predetermined functional operation may be modulo 2 of the waveform data (wave.sub.——data), i.e., f1(wave.sub.——data)=wave.sub.——data mod 2. Alternatively, the predetermined functional operation may be modulo 2 of a sum of the values of the waveform data and its sample point data, i.e., f2(wave.sub.——data, sample.sub.——point)=(wave.sub.——data+sample.sub.——point).

Figure 11:
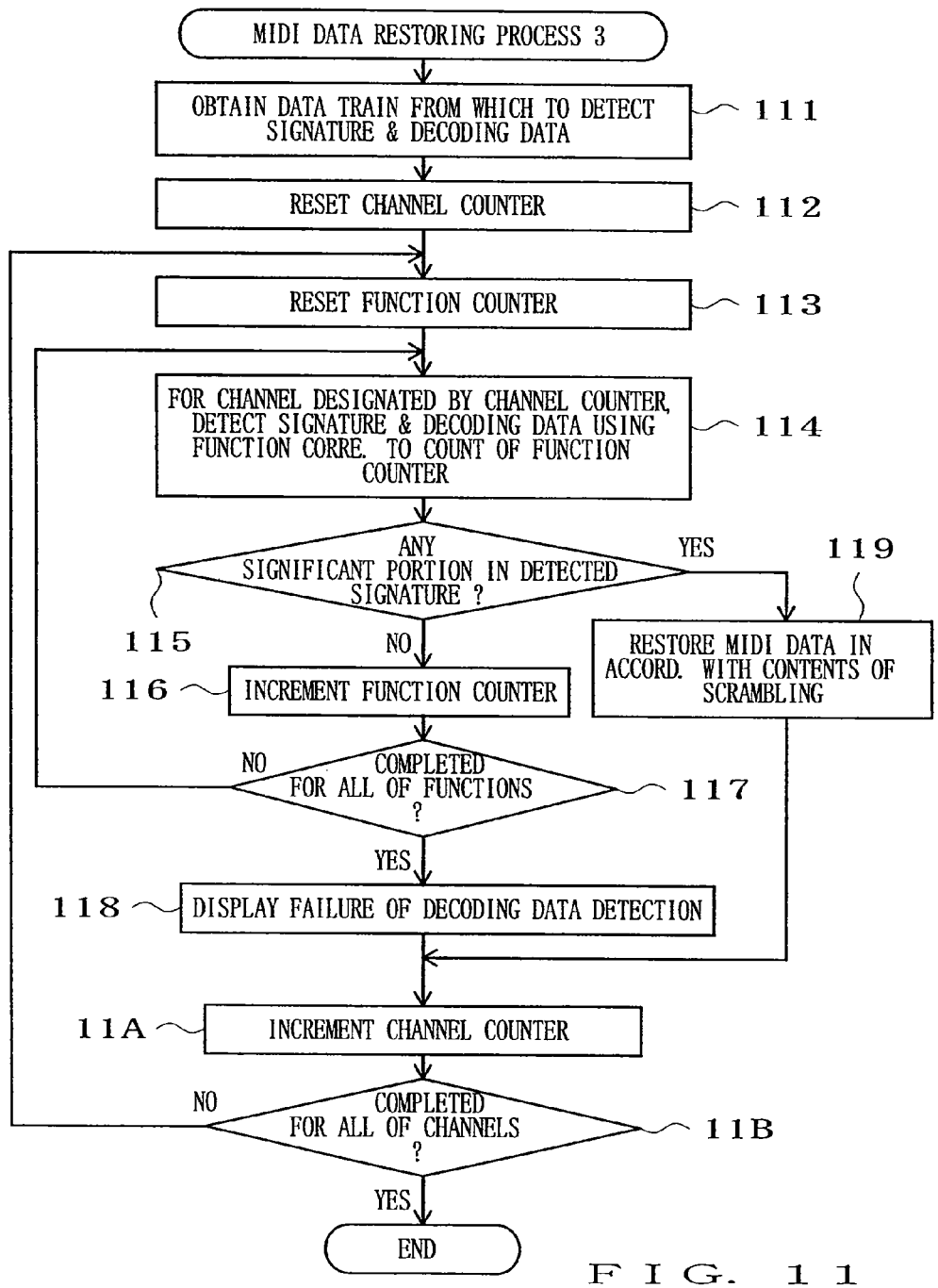
FIG. 11 is a flow chart showing still another example of the MIDI data restoring process ("MIDI data restoring process 3") when the electronic musical instrument operates as the electronic information processing system.

Also, whereas the processes of FIGS. 10 and 11 have been described above in relation to the case where the signature data is detected with the type of the functional operation changed for each of the (logical) channels, the functional operation may be changed each time program change data is detected. In this case, it is necessary to determine whether the detected data train contains any significant portion, in response to detection of each program change data.

Further, whereas the preferred embodiments have been described as visually displaying the detected electronic signature information on the monitor, the data reproduction may be cancelled when no electronic signature data is present or detected electronic signature data can not be restored completely (i.e., when logical channels with and without detectable electronic signature data exist mixedly). Further, in a situation where the electronic musical instrument or computer detecting the electronic signature data is connected to a communication network, a host computer may detect a message therefrom indicating that wrongly edited data is present on the network.

Moreover, whereas the preferred embodiments have been described above in relation to the case where the electronic musical instrument operates as a MIDI data editing device or MIDI data restoring device, such devices may be implemented by separate hardware, software or a combination of a DSP (Digital Signal Processor) and microprograms. As another example, such MIDI data editing and restoring devices may be provided in advance in the floppy disk drive, communication interface or the like so that electronic signature data is compulsorily imparted and detected at the data input/output stages.

Furthermore, the preferred embodiments have been described above in relation to the case where electronic signature data and scramble decoding data are imparted; alternatively, data having electronic signature data and scramble decoding data already imparted thereto may be supplied from a floppy disk or compact disk or supplied electronically via a communication network.

Whereas step 8B of FIG. 8 has been described above as incrementing the velocity data value by one, the velocity data value may be decremented at step 8B, or the incrementing and decrementing of the velocity data value may be conducted alternately at suitable timing (e.g., at intervals of a predetermined number of data).

Moreover, whereas the preferred embodiments have been described above in relation to the case where the bit inversion is conducted after execution of the predetermined functional operation, this bit inversion may be omitted. It should be obvious that substitution between the upper and lower bits, logical operation such as AND, OR or XOR operation or the like may be conducted in place of the bit inversion operation. Also, an appropriate encoding operation may be applied. For example, results of the above-mentioned first to fourth functional operations may be combined in any suitable manner, or a result of the last-conducted functional operation may be used in combination with a result of the current functional operation.

These operations may be executed in any other manners than the above-mentioned as long as they are allowed to be conducted at a relatively high speed and restored to original conditions through a reverse conversion.

In addition, whereas the preferred embodiments have been described above in relation to the case where the process for imparting electronic signature data and scramble decode data is executed each time program change data is detected, this process may be carried out in response to detection of each predetermined measure data (e.g., every eight measures). Also, where the additional data is dispersedly recorded in waveform data, the signature data imparting process may be newly conducted once for every predetermined number of samples or every predetermined zero-cross point. Because, the zero-cross point, where the waveform value changes between the plus and minus phases, is considered to be a reference point in editing the waveform.

Furthermore, the preferred embodiments have been described above as recording additional information such as electronic signature data or title of a music piece. Alternatively, where MIDI data and waveform data are recorded in combination, part of the waveform data may be recorded in the MIDI data or part of the MIDI data may be recorded in the waveform data.

Moreover, the preferred embodiments have been described above as recording signature data dispersedly in the velocity sections of MIDI data, but this is just illustrative, and any of various other electronic information may of course be dispersedly recorded, such as text information on the author's name, title of a music piece, title of image data or the like, information relating to the data format, or information relating to commentary on the music piece, author, year of production, lyrics, hardware ID (model name of the device, OS employed, etc.) and the like. In this case, it is only sufficient that the processes of FIGS. 8 to 11 be carried out with the electronic signature replaced with any of the above-listed other electronic information. The thus-processed electronic information will be displayed on the monitor screen.

At that time, the additional information may be detected as a series of file information for subsequent storage in a memory or utilization as necessary, or identified as a stream of electronic information detected from among MIDI data during an automatic performance so as to be displayed on the screen in real time. In this case, if the additional information is image information, images are generated in real time in response to the received MIDI data as main information; if the additional information is text information, real-time information, such as the latest news, can be visually displayed. In addition, because the additional information imparting technique is very simple, electronic information can be embedded on demand or otherwise, so that real-time image drawing is possible via TV broadcasting or otherwise. The principle of the present invention is also applicable to delivery of ID or password via the Internet or electronic mail. Simple sound message may be contained as another example of the additional information.

Figure 16:
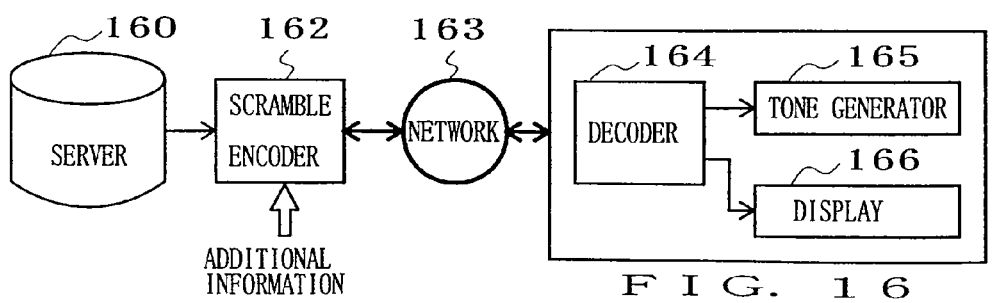
FIG. 16 is a block diagram schematically showing another embodiment of the present invention that operates through a communication network.

FIG. 16 is a block diagram schematically showing an embodiment of the present invention that operates through a communication network as mentioned above. At a transmitting end, a server 160 provides main information to be transmitted (e.g., music performance information such as MIDI information). Scramble encoder 161 incorporates optional additional information into the main information in the manner as shown and described above in relation to the preferred embodiments. Then, the main information with the optional additional information is transmitted via a communication network 163 to a receiving end, where a scramble decoder 164 detects and decodes particular regions of the main information having the additional information incorporated therein and then separates the main information and the additional information for reproduction of the original data arrangement, in the manner as shown and described above in relation to the preferred embodiments. After that, the main information comprising music performance information such as MIDI information is supplied to a tone generator 165 for audible reproduction of the music performance, while the additional information comprising data representative of a text message, still or moving picture and the like is given to and visually shown on a display 166 in real time. The scramble encoder 161 and decoder 164 in this embodiment may be implemented by software as stated earlier or by dedicated hardware.

In the above-described first embodiment, i.e., MIDI data editing process 1 of FIG. 3, step 38 calculates a difference between key codes of last and current key-on event data (i.e., stored values in the registers b0 and b) to set the calculated difference into the key-code difference value register dkey and also calculates a difference between velocities of last and current key-on event data (i.e., stored values in the registers c0 and c) to set the calculated difference into the velocity difference value register dvel. Thus, key code and velocity values b1 and c1 converted through the operations of steps 3A and 3G will always have a close relationship with the key code and velocity of the last key-on event. Similarly, in MIDI data restoring process 1 of FIG. 4, a restored key code value b2 is calculated on the basis of the stored values in the last-key-code register b0 and current key code register b, and a restored velocity value c2 is calculated on the basis of the stored values in the last-velocity register c0 and current velocity register c.

With this arrangement, if MIDI event data (key code or velocity value) is modified after the MIDI data editing process of FIG. 3, all key code and velocity values restored after the MIDI event data modification may completely differ from the original data. This may be somewhat advantageous in that all data following alteration of particular data can be made void, but would present the inconvenience that, when there occurs an error in event data to change the key code or velocity, data following the change can not be restored effectively.

Figure 13:
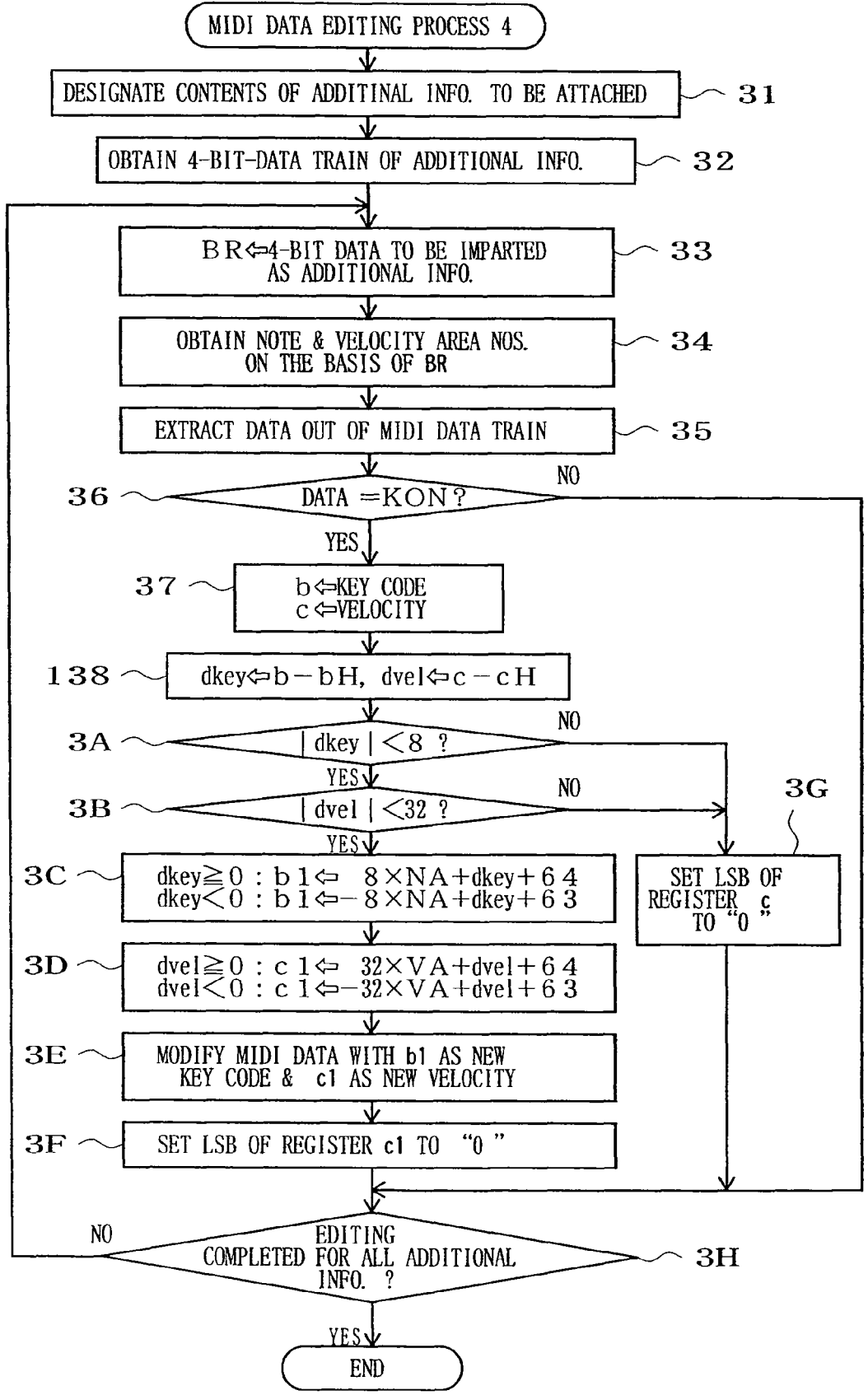
FIG. 13 is a flowchart showing still another example of the MIDI data editing process ("MIDI data editing process 4") when the electronic musical instrument operates as the electronic information processing system.
Figure 14:
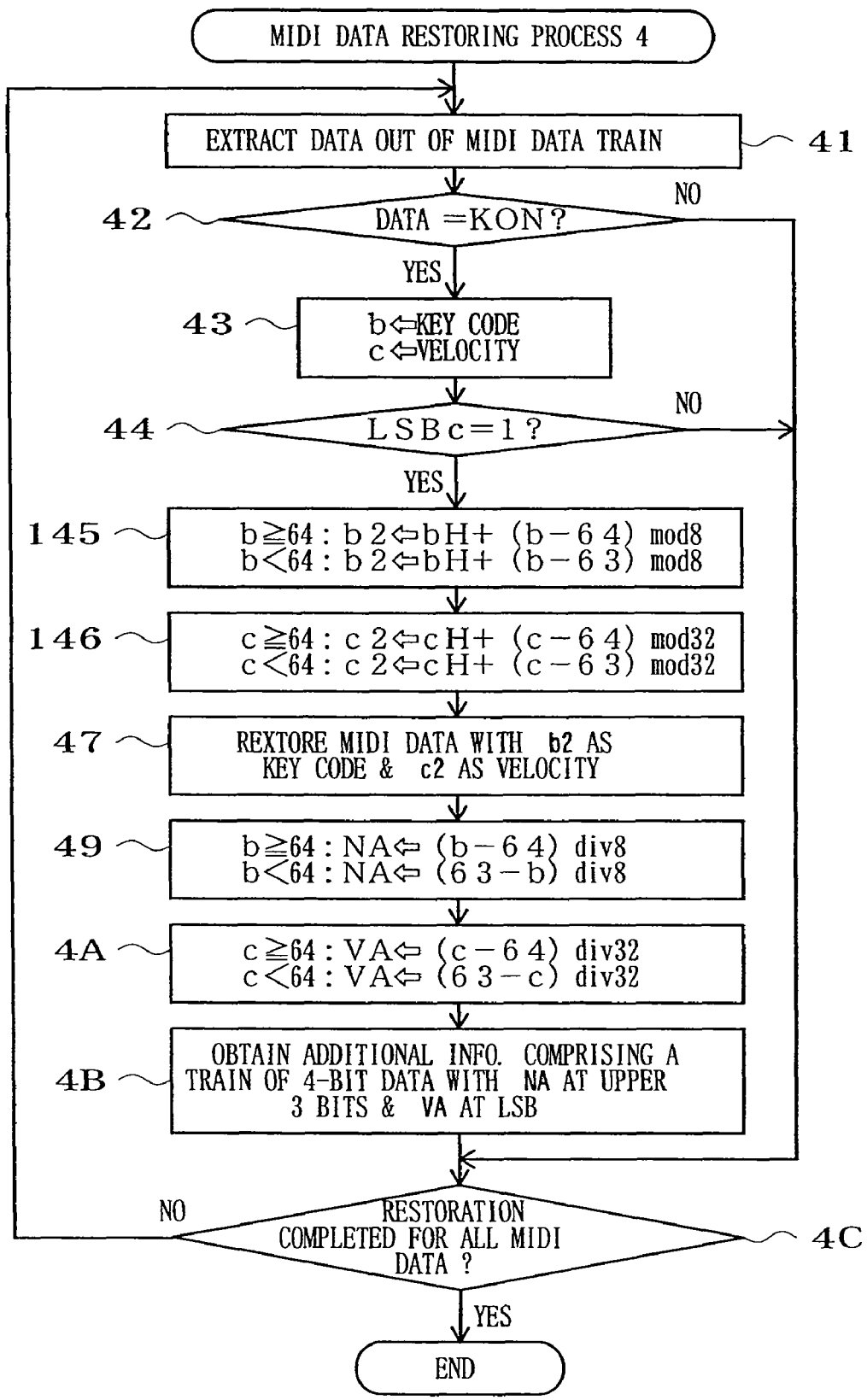
FIG. 14 is a flow chart showing still another example of the MIDI data restoring process ("MIDI data restoring process 4") when the electronic musical instrument operates as the electronic information processing system.

Thus, it is proposed here that the MIDI data editing process of FIG. 3 and MIDI data restoring process of FIG. 4 be modified into MIDI data editing process 4 of FIG. 13 and MIDI data restoring process 4 of FIG. 14, respectively, so as to permit an effective restoration of data following a rewrite or alteration of particular event data.

In MIDI data editing process 4 of FIG. 13, blocks designated by the same step numbers as in MIDI data editing process 1 of FIG. 3 represent the same operations and will not be described here to avoid unnecessary duplication. MIDI data editing process 4 of FIG. 13 is different from MIDI data editing process 1 of FIG. 3 in that it does not include step 39 of FIG. 3 and its step 138, corresponding to step 38 of FIG. 3, uses leading or head value registers bH and cH in place of the last value registers b0 and c0 of step 38. More specifically, step 138 calculates a difference between a key code of first-extracted or leading key-on event data stored in the head value register bH and a key code of current key-on event data stored in the current key code register b to thereby set the calculated difference into the key-code difference value register dkey. Step 138 also calculates a difference between a velocity of first-extracted or leading key-on event data stored in the head value register cH and a velocity of current key-on event data stored in the current velocity register c to thereby set the calculated difference into the velocity difference value register dvel. Then, a new key code and velocity b1 and c1 are calculated on the basis of the thus-stored values in the key-code difference value register dkey and velocity difference value register dvel.

Further, in MIDI data restoring process 4 of FIG. 14, blocks designated by the same step numbers as in MIDI restoring process 1 of FIG. 4 represent the same operations and will not be described here. MIDI data restoring process 4 of FIG. 14 is different from MIDI data restoring process 1 of FIG. 4 in that it does not include step 48 of FIG. 4 and its steps 145 and 146, corresponding to steps 45 and 46 of FIG. 4, uses head value registers bH and cH in place of the last value registers bo and co of steps 45 and 46. More specifically, step 145 calculates a restored key code, to be set into the register b2, on the basis of the stored values in the head value register bH and current key code register b. Step 146 calculates a restored velocity, to be set into the register c2, on the basis of the stored values in the head value register cH and key code register c.

The modified processes of FIGS. 13 and 14 allow MIDI data to be edited and restored on the basis of the values of the head event data and thus can avoid the inconvenience that event data following a change, due to rewrite or error, of particular subsequent event data can not be restored effectively; that is, the modifications provide for a complete restoration of event data following the erroneous event data.

Note that whereas the modifications have been described above as editing MIDI data on the basis of values of leading event data, optional values may be previously written in the header of the MIDI data so that the MIDI data is edited and restored on the basis of the rewritten values. Alternatively, values of the reference event data may be obtained from an optional event such as a leading event within a measure.

Figure 15:
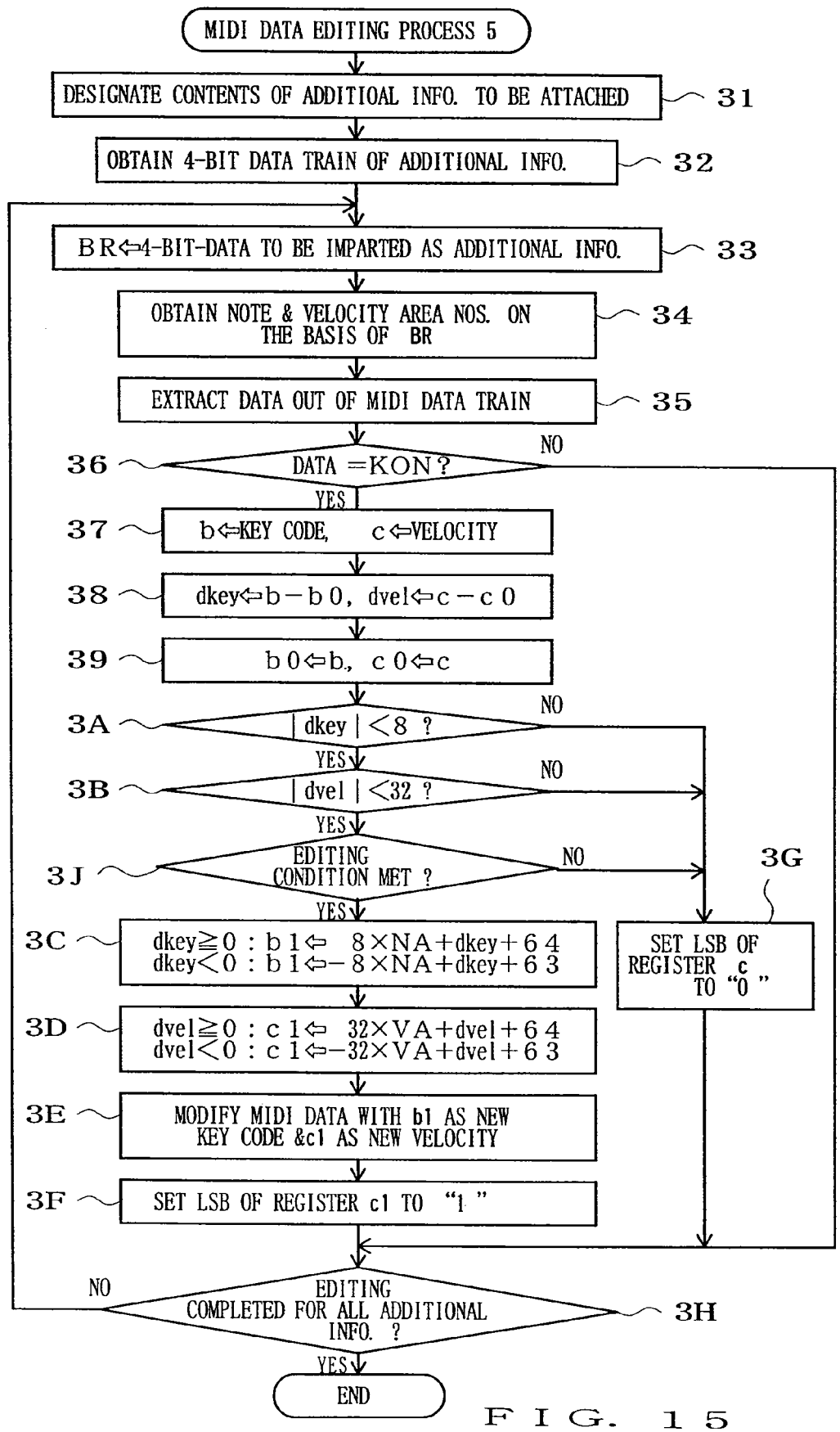
FIG. 15 is a flowchart showing still another example of the MIDI data editing process ("MIDI data editing process 5") when the electronic musical instrument operates as the electronic information processing system.

In MIDI data editing process 1 of FIG. 3 and MIDI data editing process 4 of FIG. 13, key code and velocity of key-on event data would be rewritten from the very beginning of MIDI data, so that generated tones would become quite random when the MIDI data is reproduced without the MIDI data restoring process and it is impossible to auditorily test only part of the tones. Thus, as a modification of the MIDI data editing process of FIG. 3, step 3J for determining an editing condition may be inserted between steps 3B and 3C so that the scrambling process is performed on MIDI data only when a particular editing condition is met, as shown in MIDI data editing process 5 of FIG. 15. Further, as a modification of the MIDI data editing process of FIG. 13, step 3J may be inserted between steps 3B and 3C in a similar manner to FIG. 15.

For example, as the editing condition of step 3J, it may be determined whether or not a predetermined length of time (e.g., 30 seconds) has elapsed from a start of performance of MIDI data. This condition will prevent the scrambling process from being performed on a beginning portion of the MIDI data so that the beginning portion is reproduced via a normal MIDI data reproduction process. On the other hand, when other portions of the MIDI data are to be reproduced after passage of the predetermined length of time, only random tones will be reproduced because the other portions have been scrambled. With this arrangement, the beginning portion of MIDI data can be listened to by being reproduced by the normal MIDI data reproduction process, while the other portions of the MIDI data can be made data that can not be auditorily tested. Note that the editing condition may be set optionally from outside the musical instrument and that two or more conditions, other than a time-related condition, may be applied in combination. For example, such conditions as to whether a period with no generated sound has lasted for over a predetermined time length and whether a predetermined number of measure line data have occurred may be applied singly or in combination.

In summary, the present invention, having been described so far, affords the benefits that it can attach supplementary or additional information to main information, such as music data, image data or waveform data, without changing the data format of the main information and also can encode the main and additional information in such a manner that these information can not be reproduced and used unless they are decoded properly.

What is claimed is:

1. An electronic information processing device for encrypting main information, data of said main information including a group of data units, said main information comprising a plurality of MIDI events, said electronic information processing device comprising a hardware encoder comprising:

a first section that incorporates data of encrypting information, representative of an encrypting procedure, dispersedly into particular ones of the data units belonging to a predetermined first data group of said main information, said encrypting information being scramble decoding data representative of one of a plurality of types of algorithms to be used for the encrypting procedure, the scramble decoding data comprising data of a plurality of bits, wherein said first section, generates, for each of the bits of the scramble decoding data, a first bit flag in accordance with a logical value of the bit, generates a second bit flag of a plurality of bits on the basis of logical values of the data units belonging to the predetermined first data group, and rewrites values of the MIDI events in the data units belonging to the predetermined first data group using the first and second bit flags; and a second section that executes the encrypting procedure on the data belonging to a predetermined second data group, different from the first group, of said main information using the algorithm of the type represented by the scramble decoding data.

2. The device as recited in claim 1 wherein said first section further incorporates predetermined additional information, other than said encrypting information, into said first data group of said main information.

3. A device for decoding and reproducing encrypted main information, said main information comprising a plurality of MIDI events, data of encrypting information being incorporated dispersedly into particular data units belonging to a predetermined first data group of said main information, said encrypting information being scramble decoding data representative of one of a plurality of types of algorithms to be used for an encrypting procedure, the scramble decoding data comprising data of a plurality of bits, data belonging to a predetermined second data group, different from the first data group, of said main information being encrypted by an encrypting procedure using the algorithm of the type represented by the scramble decoding data, said device comprising a hardware decoder comprising:

a first section that reproduces said scramble decoding data, from said first data group of said main information having said scramble decoding data incorporated therein, wherein said first section reproduces, for each of a particular plurality of MIDI events in the first data group, a logical value of each of the bits of the scramble decoding data on the basis of a value thereof; and a second section that decodes the data belonging to said second data group different from said first data group, using the algorithm of the type represented by the scramble decoding data, to thereby reproduce said main information.

4. The device as recited in claim 1 wherein said first data group of said main information is classified into at least two characteristic groups according to data characteristics thereof, and said encrypting information is incorporated redundantly into said at least two characteristic groups.

5. The device as recited in claim 4 wherein said first section incorporates said encrypting information into each of the characteristic groups in accordance with an algorithm unique to said characteristic group.

6. The device as recited in claim 3 wherein said first data group of said main information is classified into at least two characteristic groups according to data characteristics thereof, and said encrypting information is incorporated redundantly into said at least two characteristic groups.

7. The device as recited in claim 1 wherein said main information to be encrypted is provided in a form of a real-time data stream, and wherein said first section incorporates the data of encrypting information, in real time, into said main information of the real-time data stream, and said second section executes the encrypting procedure, in real time, on said main information of the real-time data stream, and wherein said device further comprises a transmission section that transmits to a communication network said encrypting information incorporated therein and having been encrypted by said second section, in a form of the real-time data stream.

8. The device as recited in claim 7 wherein said main information is incorporated with additional information, and wherein said main information is music performance information and said additional information contains data representative of any one of a text message, still picture, moving picture and sound message.

9. The device as recited in claim 3 wherein said main information to be decoded is transmitted via a communication network, in a form of a real-time data stream, and wherein said device further comprises a reception section that receives said main information of the real-time data stream transmitted via the communication network, and wherein said first section reproduces said encrypting information, from said first data group of said main information of the real-time data stream received via the communication network; and wherein said second section decodes, on the basis of said encrypting information reproduced by said first section, the data belonging to said second data group of said main information of the real-time data stream received via the communication network to thereby decode said main information.

10. The device as recited in claim 9 wherein said main information is incorporated with additional information, and wherein said device further comprises a third section that detects said additional information from the main information and a fourth section that displays said additional information detected by said third section.

11. The device as recited in claim 9 wherein said main information is incorporated with additional information, and wherein said main information is music performance information and said additional information contains data representative of any one of a text message, still picture, moving picture and sound message.

12. The device as recited in claim 1 wherein said main information is music performance information, and wherein said device method further comprises a transmission section that transmits the music performance information after the execution of said encrypting procedure by said second section, whereby at a receiving end, only portions, other than a particular portion corresponding to said data belonging to the predetermined second data group, of the music performance information can be reproduced by every person while the particular portion of the music performance information having undergone the encrypting can be reproduced only by an authorized person.

* * * * *